United States Patent
Hwang et al.

(10) Patent No.: US 11,039,447 B2
(45) Date of Patent: Jun. 15, 2021

(54) METHOD FOR TRANSMITTING AND RECEIVING SIGNAL IN WIRELESS COMMUNICATION SYSTEM AND APPARATUS THEREFOR

(71) Applicant: LG Electronics Inc., Seoul (KR)

(72) Inventors: Seunggye Hwang, Seoul (KR); Changhwan Park, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/828,607

(22) Filed: Mar. 24, 2020

(65) Prior Publication Data

US 2020/0245317 A1  Jul. 30, 2020

Related U.S. Application Data

(63) Continuation of application No. PCT/KR2019/005642, filed on May 10, 2019.

(30) Foreign Application Priority Data

May 10, 2018 (KR) .................. 10-2018-0053973
May 18, 2018 (KR) .................. 10-2018-0057444

(51) Int. Cl.
*H04W 72/04* (2009.01)
*H04W 68/02* (2009.01)

(52) U.S. Cl.
CPC ......... *H04W 72/048* (2013.01); *H04W 68/02* (2013.01); *H04W 72/042* (2013.01)

(58) Field of Classification Search
CPC ... H04W 72/04; H04W 68/02; H04W 72/048; H04W 72/042
See application file for complete search history.

(56) References Cited

U.S. PATENT DOCUMENTS

| 2019/0098659 A1* | 3/2019 | Reddy ............... H04W 74/0833 |
| 2019/0158264 A1* | 5/2019 | You ................... H04W 72/0446 |
| 2021/0007054 A1* | 1/2021 | Jiang ........................ H04L 5/00 |

FOREIGN PATENT DOCUMENTS

KR      20180040717      4/2018

OTHER PUBLICATIONS

3rd Gerientice Partnership Project, Ericcson; "Wake-up signal configurations and procedures for NB-IoT" R1-1804153, 3GPP TSG-RAN WGI, Sanya, P.R. China, dated Apr. 2018, 9 pages.

(Continued)

*Primary Examiner* — Kyaw Z Soe
(74) *Attorney, Agent, or Firm* — Fish & Richardson P.C.

(57) ABSTRACT

The present invention relates to a method for receiving a downlink signal and an apparatus therefor. Specifically, the method for receiving a downlink signal comprises the steps of: receiving first time offset information and second time offset information from a base station, wherein the first time offset information and the second time offset information each indicate the time offset between the reception time of a specific signal and the reception time of a specific channel associated with the specific signal, and the first time offset information is set to have a length shorter than that of the second time offset information; and monitoring the specific signal at a time position determined on the basis of one of the first time offset information and the second time offset information, wherein the one offset information is determined on the basis of the capability of a user device.

15 Claims, 35 Drawing Sheets

(56) References Cited

OTHER PUBLICATIONS

3rd Generation Partnership Project, Huawei HiSilicon, "Wake-up signal in NB-IoT and eMTC," R2-1805082, Sanya, P.R, China, dated Apr. 2018, 11 pages.
3rd Generation Partnership Project; Qualcomm Incorporated; "Efficient monitoring of DL control channels," R1;1804914, 3GPP TSG RAN WG1, Sanya, China, dated Apr. 2018, 13 pages.
$3^{rd}$ Generation Partnership Project Samsung, "Discussion on Wake up signal configuration," R1-1720264, 3GPP TSG RAN WG1, Reno, USA, dated Nov.-Dec. 2017, 5 page.
International Search Report in International Appln. No. PCT/KR2019/005642, dated Sep. 6, 2019, 21 pages (with English translation).
Extended European Search Report in European Application No. 19800695.9, dated Aug. 12, 2020, 9 pages.
Huawei, HiSilicon, "Feature lead summary of Wake-up signal configurations and procedures in NB-IoT," R1-1805289, 3GPP TSG RAN WG1 Meeting #92bis, Sanya, China, dated Apr. 16-20, 2018, 11 pages, XP051427638.

\* cited by examiner

In-band system

Guard-band system

Stand-alone system

METHOD FOR TRANSMITTING AND RECEIVING SIGNAL IN WIRELESS COMMUNICATION SYSTEM AND APPARATUS THEREFOR

CROSS-REFERENCE TO RELATED APPLICATIONS

This application is a continuation of International Application No. PCT/KR2019/005642, filed on May 10, 2019, which claims the benefit of Korean Application No. 10-2018-0057444, filed on May 18, 2018, and Korean Application No. 10-2018-0053973, filed on May 10, 2018. The disclosures of the prior applications are incorporated by reference in their entirety.

TECHNICAL FIELD

The present disclosure relates to a wireless communication system, and more specifically relates to a method of transmitting or receiving a downlink signal or channel and an apparatus therefor.

BACKGROUND

Mobile communication systems were developed to provide voice services while ensuring mobility of users. However, mobile communication systems have been extended to data services as well as voice services, and more advanced communication systems are needed as the explosive increase in traffic now leads to resource shortages and users demand higher speed services.

Requirements of the next generation mobile communication systems are to support accommodation of explosive data traffics, dramatic increases in throughputs per user, accommodation of significantly increased number of connected devices, very low end-to-end latency, and high energy efficiency. To this end, various technologies such as Dual Connectivity, Massive Multiple Input Multiple Output (Massive MIMO), In-band Full Duplex, Non-Orthogonal Multiple Access (NOMA), support of Super wideband, and Device Networking are under research.

SUMMARY

An aspect of the present disclosure is to provide a method and apparatus for efficiently transmitting and receiving a downlink signal or channel.

Particularly, an aspect of the present disclosure is to provide a method and apparatus for efficiently transmitting and receiving a downlink signal or channel by effectively configuring a relationship between a specific signal or channel carrying information and a signal or channel to which the information is targeted.

It will be appreciated by persons skilled in the art that the objects that could be achieved with the present disclosure are not limited to what has been particularly described hereinabove and the above and other objects that the present disclosure could achieve will be more clearly understood from the following detailed description.

In a first aspect of the present disclosure, provided herein is a method of receiving a downlink signal by a user equipment, the method comprising: receiving first time offset information and second time offset information from a base station, each of the first time offset information and the second time offset information indicating a time offset between a receiving time of a specific signal and a receiving time of a specific channel related to the specific signal, the first time offset information being configured to have a shorter length than the second time offset information; and monitoring the specific signal at a time position determined based on one offset information of the first time offset information and the second time offset information, wherein the one offset information may be determined based on a capability of the user equipment.

In a second aspect of the present disclosure, provided herein is a user equipment for receiving a downlink signal in a wireless communication system, the user equipment comprising: a transceiver; and a processor operatively connected to the transceiver, wherein the processor is configured to: control the transceiver to receive first time offset information and second time offset information from a base station, and monitor the specific signal at a time position determined based on one offset information of the first time offset information and the second time offset information, wherein each of the first time offset information and the second time offset information may indicate a time offset between a receiving time of a specific signal and a receiving time of a specific channel related to the specific signal, and the first time offset information may be configured to have a shorter length than the second time offset information, and wherein the one offset information may be determined based on a capability of the user equipment.

In a third aspect of the present disclosure, provided herein is an apparatus for a user equipment for receiving a downlink signal in a wireless communication system, the apparatus comprising: a memory including executable codes; and a processor operatively connected to the memory, wherein the processor is configured to execute the executable codes to implement operations comprising: receiving first time offset information and second time offset information from a base station, and monitoring the specific signal at a time position determined based on one offset information of the first time offset information and the second time offset information, wherein each of the first time offset information and the second time offset information may indicate a time offset between a receiving time of a specific signal and a receiving time of a specific channel related to the specific signal, and the first time offset information may be configured to have a shorter length than the second time offset information, and wherein the one offset information may be determined based on a capability of the user equipment.

Preferably, the first time offset information and the second time offset information may be received through a system information block (SIB).

More preferably, the first time offset information and the second time offset information may be received through independent fields of the SIB.

Preferably, the first time offset information and the second time offset information may be received through a radio resource control (RRC) signal.

More preferably, the first time offset information and the second time offset information may be received through independent fields of the RRC signal.

Preferably, each of the first time offset information and the second time offset information may indicate a time offset between a reception ending time of the specific signal and a reception starting time of the specific channel.

Preferably, each of the first time offset information and the second time offset information may indicate a time offset between a reception starting time of the specific signal and a reception starting time of the specific channel.

Preferably, the time position may be determined based on a paging occasion (PO) configured for the user equipment and the one time offset information.

Preferably, the capability of the user equipment may be reported to the base station.

Preferably, the method or the operations may further comprise monitoring the specific channel based on detection of the specific signal.

Preferably, the specific signal may be a physical signal, and the specific channel may be a physical control channel.

Preferably, the physical signal may be a wake up signal (WUS), and the physical control channel may be a narrowband physical downlink control channel (NPDCCH) for paging.

According to the present disclosure, a downlink signal or channel may be efficiently transmitted or received.

Particularly according to the present disclosure, a downlink signal or channel may be efficiently transmitted or received by effectively configuring a relationship between a specific signal or channel carrying information and a signal or channel to which the information is targeted.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, illustrate embodiments of the disclosure and together with the description serve to explain the principle of the disclosure.

DETAILED DESCRIPTION

In the following, downlink (DL) refers to communication from a base station (BS) to a user equipment (UE), and uplink (UL) refers to communication from the UE to the BS. In the case of DL, a transmitter may be a part of the BS, and a receiver may be a part of the UE. In the case of UL, a transmitter may be a part of the UE, and a receiver may be a part of the BS.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) or LTE-A pro is an evolved version of the 3GPP LTE. 3GPP new radio or new radio access technology (3GPP NR) is an evolved version of the 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. The 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)

Figure 1:
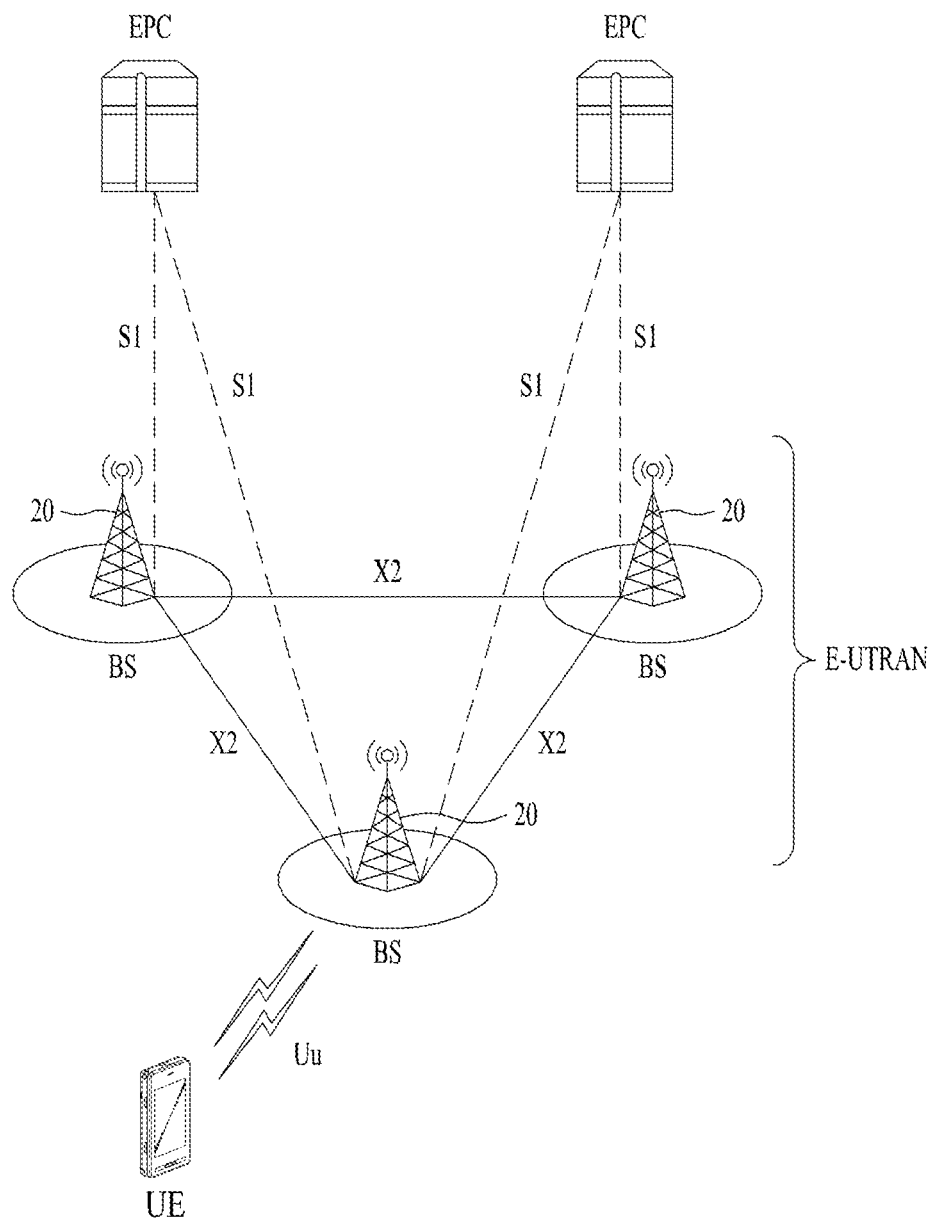
FIG. 1 illustrates an example of the 3GPP LTE system architecture.

3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification A. System Architecture FIG. 1 illustrates an example of the 3GPP LTE system architecture.

A wireless communication system may be referred to as an evolved-UMTS terrestrial radio access network (E-UTRAN) or a long term evolution (LTE)/LTE-A system. Referring to FIG. 1, the E-UTRAN includes at least one BS 20 that provides control and user planes to a UE 10. The UE 10 may be fixed or mobile. The UE 10 may be referred to as another terminology such as 'mobile station (MS)', 'user terminal (UT)', 'subscriber station (SS)', 'mobile terminal (MT)', or 'wireless device'. In general, the BS 20 may be a fixed station that communicates with the UE 10. The BS 20 may be referred to as another terminology such as 'evolved Node-B (eNB)', 'general Node-B (gNB)', 'base transceiver system (BTS)', or 'access point (AP)'. The BSs 20 may be interconnected through an X2 interface. The BS 20 may be connected to an evolved packet core (EPC) through an S1 interface. More particularly, the BS 20 may be connected to a mobility management entity (MME) through S1-MME and to a serving gateway (S-GW) through S1-U. The EPC includes the MME, the S-GW, and a packet data network-gateway (P-GW). Radio interface protocol layers between the UE and network may be classified into Layer 1 (L1), Layer 2 (L2), and Layer 3 (L3) based on three lower layers of the open system interconnection (OSI) model well known in communication systems. A physical (PHY) layer, which belongs to L1, provides an information transfer service over a physical channel. A radio resource control (RRC) layer, which belongs to L3, controls radio resources between the UE and network. To this end, the BS and UE may exchange an RRC message through the RRC layer.

Figure 2:
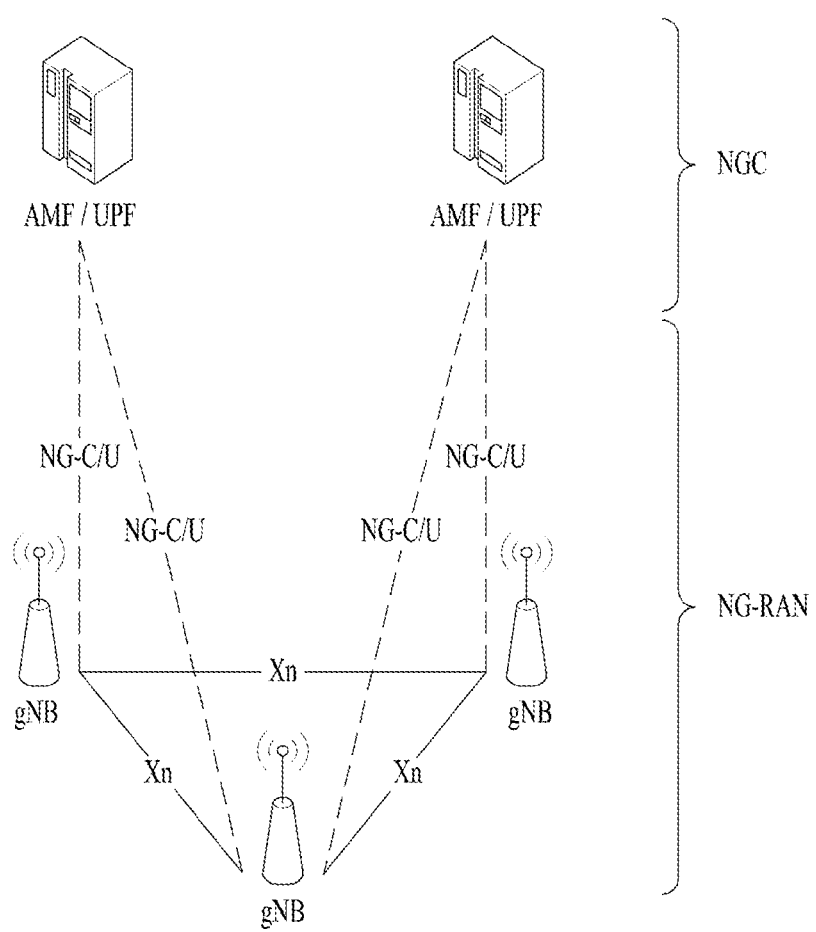
FIG. 2 illustrates an example of the 3GPP NR system architecture.

FIG. 2 illustrates an example of the 3GPP NR system architecture.

Referring to FIG. 2, a NG-RAN includes gNBs, each of which provides a NG-RA user plane (e.g., new AS sublayer/PDCP/RLC/MAC/PHY) and a control plane (RRC) protocol terminal to a UE. The gNBs are interconnected through an Xn interface. The gNB is connected to an NGC through a NG interface. More particularly, the gNB is connected to an access and mobility management function through an N2 interface and to a user plane function (UPF) through an N3 interface.

B. Frame Structure

Hereinafter, an LTE frame structure will be described.

In the LTE standards, the sizes of various fields in the time domain are expressed in a time unit (Ts=1/(15000×2048) seconds) unless specified otherwise. DL and UL transmissions are organized in radio frames, each of which has a duration of 10 ms (Tf=307200×Ts=10 ms). Two radio frame structures are supported.

Type 1 is applicable to frequency division duplex (FDD).
Type 2 is applicable to time division duplex (TDD).

(1) Frame Structure Type 1

Frame structure type 1 is applicable to both full-duplex FDD and half-duplex FDD. Each radio frame has a duration of $T_f=307200 \cdot T_s=10$ ms and is composed of 20 slots, each of which has a length of $T_{slot}=15360 \cdot T_s=0.5$ ms. The 20 slots are indexed from 0 to 19. A subframe is composed of two consecutive slots. That is, subframe i is composed of slot $2i$ and slot $(2i+1)$. In the FDD, 10 subframes may be used for DL transmission, and 10 subframes may be available for UL transmissions at every interval of 10 ms. DL and UL transmissions are separated in the frequency domain. However, the UE may not perform transmission and reception simultaneously in the half-duplex FDD system.

Figure 3:
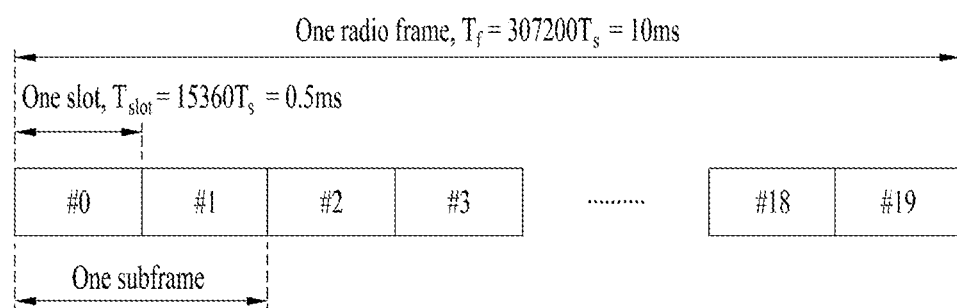
FIG. 3 illustrates a radio frame structure of frame structure type 1

FIG. 3 illustrates a radio frame structure of frame structure type 1.

Referring to FIG. 3, the radio frame includes 10 subframes. Each subframe includes two slots in the time domain. The time to transmit one subframe is defined as a transmission time interval (TTI). For example, one subframe may have a length of 1 ms, and one slot may have a length of 0.5 ms. One slot may include a plurality of orthogonal frequency division multiplexing (OFDM) symbols in the time domain. Since the 3GPP LTE system uses OFDMA in DL, the OFDM symbol may represent one symbol period. The OFDM symbol may be referred to as an SC-FDMA symbol or a symbol period. A resource block (RB) is a resource allocation unit and includes a plurality of consecutive subcarriers in one slot. This radio frame structure is merely exemplary. Therefore, the number of subframes in a radio frame, the number of slots in a subframe, or the number of OFDM symbols in a slot may be changed in various ways.

(2) Frame Structure Type 2

Frame structure type 2 is applicable to TDD. Each radio frame has a length of $T_f=307200 \times T_s=10$ ms and includes two half-frames, each of which has a length of $15360 \cdot T_s=0.5$ ms. Each half-frame includes five subframes, each of which has a length of $30720 \cdot T_s=1$ ms Supported UL-DL configurations are defined in the standards. In each subframe of a radio frame, "D" denotes a subframe reserved for DL transmission, "U" denotes a subframe reserved for UL transmission, and "S" denotes a special subframe including the following three fields: downlink pilot time slot (DwPTS), guard period (GP), and uplink pilot time slot (UpPTS). The DwPTS may be referred to as a DL period, and the UpPTS may be referred to as a UL period. The lengths of the DwPTS and UpPTS depend on the total length of the DwPTS, GP, and UpPTS, which is equal to $30720 \cdot T_s=1$ ms Subframe i is composed of two slots, slot $2i$ and slot $(2i+1)$, each of which has a length of $T_{slot}=15360 \cdot T_s=0.5$ ms.

Figure 4:
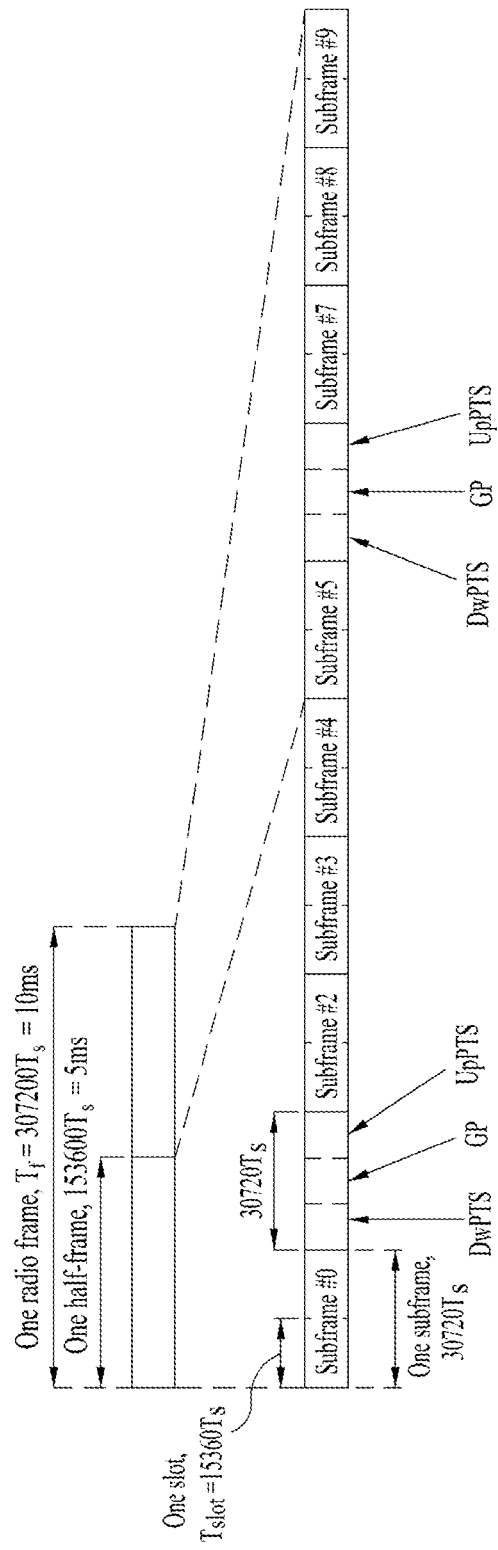
FIG. 4 illustrates a radio frame structure of frame structure type 2.

FIG. 4 illustrates a radio frame structure of frame structure type 2.

FIG. 4 shows that a UL-DL configuration supports DL-to-UL switch-point periodicities of 5 ms and 10 ms. In the case of the 5-ms DL-to-UL switch-point periodicity, the special subframe exists across two half-frames. In the case of the 10-ms DL-to-UL switch-point periodicity, the special subframe exists only in the first half-frame. The DwPTS and subframe 0 and 5 are always reserved for DL transmission, and the UpPTS and a subframe next to the special subframe are always reserved for UL transmission.

Next, a description will be given of a frame structure of NR.

Figure 5:
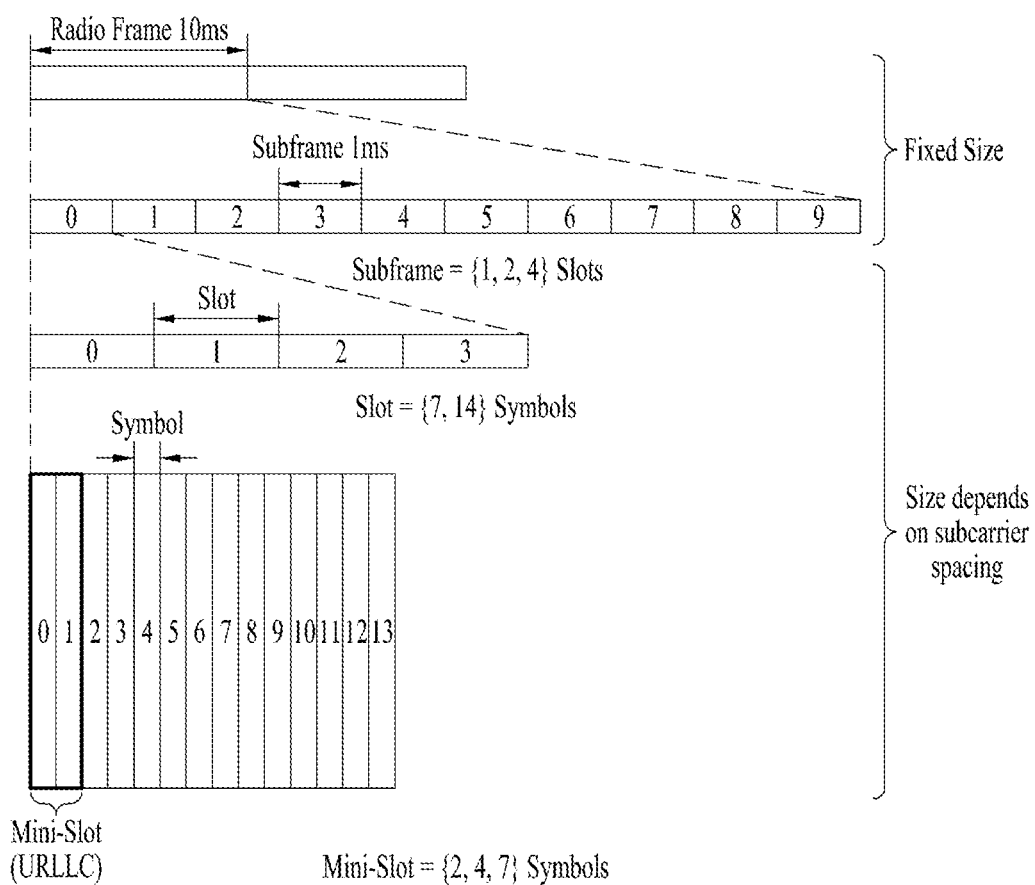
FIG. 5 illustrates an example of a frame structure in NR.

FIG. 5 illustrates an example of a frame structure in NR.

The NR system may support various numerologies. The numerology may be defined by subcarrier spacing and cyclic prefix (CP) overhead. Multiple subcarrier spacing may be derived by scaling basic subcarrier spacing by an integer N (or μ). In addition, even though very low subcarrier spacing is assumed not to be used at a very high subcarrier frequency, a numerology to be used may be selected independently from frequency bands. In the NR system, various frame structures may be supported based on multiple numerologies.

Hereinafter, an OFDM numerology and a frame structure, which may be considered in the NR system, will be described. Table 1 shows multiple OFDM numerologies supported in the NR system.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, the sizes of various fields in the time domain are expressed in multiples of a time unit, $T_s = 1/(\Delta f_{max} \cdot N_f)$. In this case, $\Delta f_{max} = 480 \cdot 10^3$ and $N_f = 4096$. Downlink and uplink transmissions are configured in a radio frame having a duration of $T_f = (\Delta f_{max} N_f/100) \cdot T_s = 10$ ms. The radio frame is composed of 10 subframes, each having a duration of $T_{sf} = (\Delta f_{max} N_f/1000) \cdot T_s = 1$ ms. In this case, there may be a set of uplink frames and a set of downlink frames. Transmission of an uplink frame with frame number i from a UE needs to be performed earlier by $T_{TA} = N_{TA} T_s$ than the start of a corresponding downlink frame of the UE. Regarding the numerology μ, slots are numbered in a subframe in the following ascending order: $n_s^\mu \in \{0, \ldots, N_{subframe}^{slots,\mu}-1\}$ and numbered in a frame in the following ascending order: $n_{s,f}^\mu \in \{0, \ldots, N_{frame}^{slots,\mu}-1\}$. One slot is composed of $N_{symb}^\mu$ consecutive OFDM symbols, and $N_{symb}^\mu$ is determined by the current numerology and slot configuration. The starts of $n_s^\mu$ slots in a subframe are temporally aligned with those of $n_s^\mu N_{symb}^\mu$ OFDM symbols in the same subframe. Some UEs may not perform transmission and reception at the same time, and this means that some OFDM symbols in a downlink slot or an uplink slot are unavailable. Table 2 shows the number of OFDM symbols per slot ($N_{symb}^{slot}$) the number of slots per radio frame ($N_{slot}^{frame,\mu}$), and the number of slots per subframe ($N_{slot}^{subframe,\mu}$) in the case of a normal CP, and Table 3 shows the number of OFDM symbols per slot, the number of slots per radio frame, and the number of slots per subframe in the case of an extended CP.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 shows an example of μ=2, i.e., 60 kHz subcarrier spacing (SCS). Referring to Table 2, one subframe may include four slots. FIG. 5 shows slots in a subframe (subframe={1, 2, 4}). In this case, the number of slots included in the subframe may be defined as shown in Table 2 above.

In addition, a mini-slot may be composed of 2, 4, or 7 symbols. Alternatively, the number of symbols included in the mini-slot may vary.

C. Physical Resource

Figure 6:
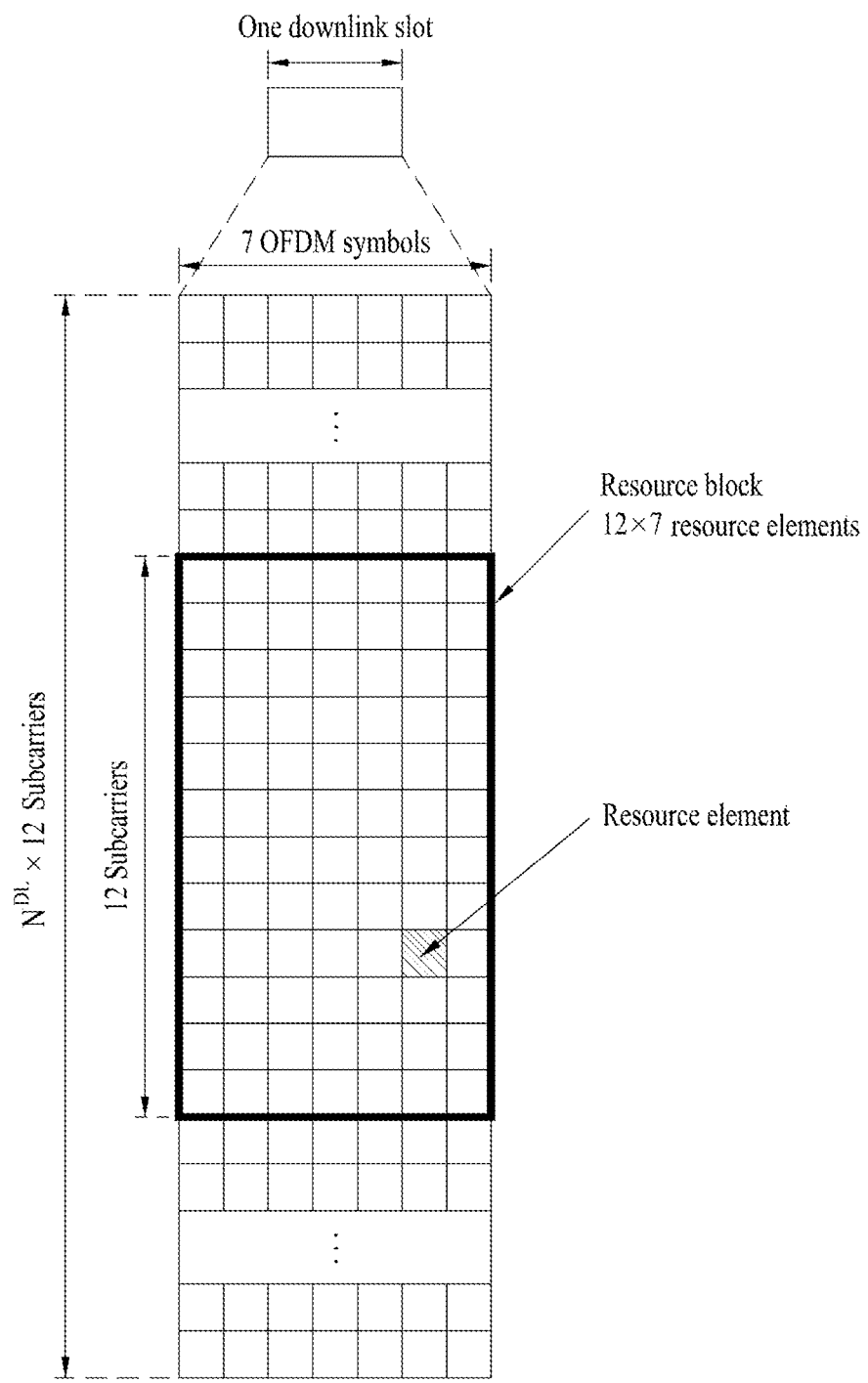
FIG. 6 illustrates a resource grid for one DL slot.

FIG. 6 illustrates a resource grid for one DL slot.

Referring to FIG. 6, a downlink slot includes a plurality of OFDM symbols in the time domain. One downlink slot includes 7 OFDM symbols in the time domain, and a resource block (RB) for example includes 12 subcarriers in the frequency domain. However, the present disclosure is not limited thereto. Each element of the resource grid is referred to as a resource element (RE). One RB includes 12×7 REs. The number of RBs in the DL slot depends on a downlink transmission bandwidth. An uplink slot may have the same structure as the downlink slot.

Figure 7:
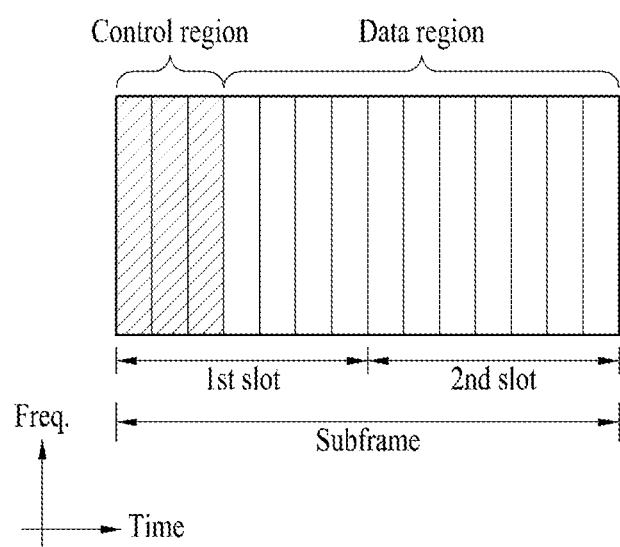
FIG. 7 illustrates the structure of a downlink subframe.

FIG. 7 illustrates the structure of a downlink subframe.

Referring to FIG. 7, up to three OFDM symbols at the start of the first slot in a downlink subframe are used as a control region to which a control channel is allocated. The remaining OFDM symbols are used as a data region to which a physical downlink shared channel (PDSCH) is allocated. Downlink control channels used in the 3GPP LTE system include a physical control format indicator channel (PCFICH), a physical downlink control channel (PDCCH), a physical hybrid ARQ indicator channel (PHICH), etc. The PCFICH is transmitted in the first OFDM symbol in a subframe and carries information for the number of OFDM symbols used for transmitting a control channel. The PHICH carries a hybrid automatic repeat request (HARD) acknowledgement/negative-acknowledgement or not-acknowledgement (ACK/NACK) signal in response to uplink transmission. Control information transmitted on the PDCCH is referred to as downlink control information (DCI). The DCI contains uplink or downlink scheduling information or an uplink transmission (Tx) power control command for a random UE group. The PDCCH carries information for resource allocation for a downlink shared channel (DL-SCH), information for resource allocation for a uplink shared channel, paging information for a paging channel (PCH), and a DL-SCH voice over Internet protocol (VoIP) corresponding to resource allocation for a higher layer control message such as a random access response transmitted on the PDSCH, a set of Tx power control commands for individual UEs in a random UE group, a Tx power control command, activation of the Tx power control command, etc. Multiple PDCCHs may be transmitted in the control region, and the UE may monitor the multiple PDCCHs. The PDCCH may be transmitted on one control channel element (CCE) or aggregation of multiple consecutive CCEs. The CCE is a logical allocation unit used to provide the PDCCH with a coding rate based on the state of a radio channel. The CCE corresponds to a plurality of resource element groups (REGs). A PDCCH format and the number of available PDCCH bits are determined based on a relationship between the number of CCEs and the coding rate provided by the CCE. The base station determines the PDCCH format depending on DCI to be transmitted to the UE and adds a cyclic redundancy check (CRC) to control information. The CRC is masked with a unique identifier (e.g., radio network temporary identifier (RNTI)) according to the owner or usage of the PDCCH. If the PDCCH is for a specific UE, the CRC may be masked with a unique UE identifier (e.g., cell-RNTI). If the PDCCH is for a paging message, the CRC may be masked with a paging indication identifier (e.g., paging-RNTI (P-RNTI)). If the PDCCH is for system information (more specifically, for a system information block (SIB)), the CRC may be masked with a system information identifier and a system information RNTI (SI-RNTI). Further, the CRC may be masked with a random access-RNTI (RA-RNTI) to indicate a random access response in response to transmission of a random access preamble of the UE.

Figure 8:
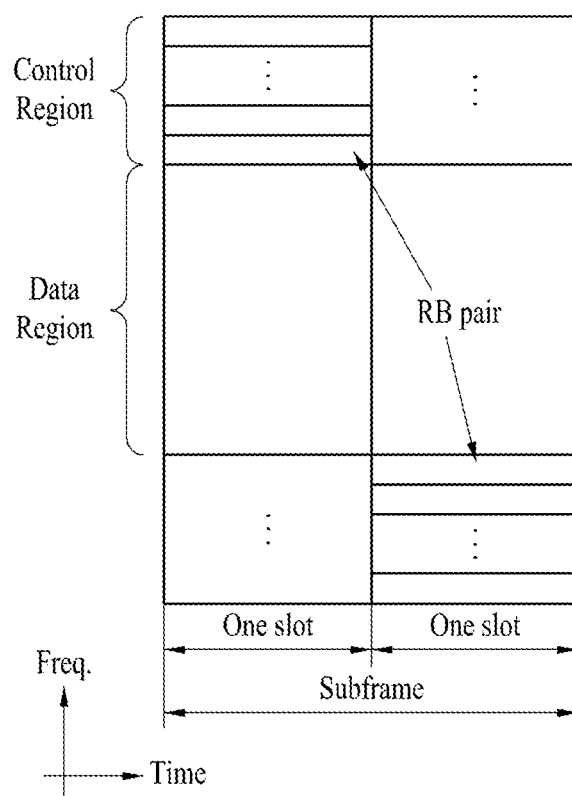
FIG. 8 illustrates the structure of an uplink subframe.

FIG. 8 illustrates the structure of an uplink subframe.

Referring to FIG. 8, an uplink subframe may be divided into a control region and a data region in the frequency domain. A physical uplink control channel (PUCCH) for carrying uplink control information may be allocated to the control region, and a physical uplink shared channel (PUSCH) for carrying user data may be allocated to the data region. The UE may not transmit the PUCCH and the PUSCH at the same time to maintain single-carrier characteristics. The PUCCH for the UE is allocated to an RB pair in a subframe. The RBs included in the RB pair occupy different subcarriers in two slots. In other words, the RB pair allocated for the PUCCH may be frequency-hopped at a slot boundary.

As physical resources in the NR system, an antenna port, a resource grid, a resource element, a resource block, a carrier part, etc. may be considered. Hereinafter, the above physical resources considered in the NR system will be described in detail. First, an antenna port may be defined such that a channel carrying a symbol on the antenna port is inferred from a channel carrying another symbol on the same antenna port. When the large-scale properties of a channel carrying a symbol on an antenna port are inferred from a channel carrying a symbol on another antenna port, the two antenna ports may be said to be in quasi co-located or quasi co-location (QC/QCL) relationship. The large-scale properties may include at least one of delay spread, Doppler spread, frequency shift, average received power, and received timing.

Figure 9:
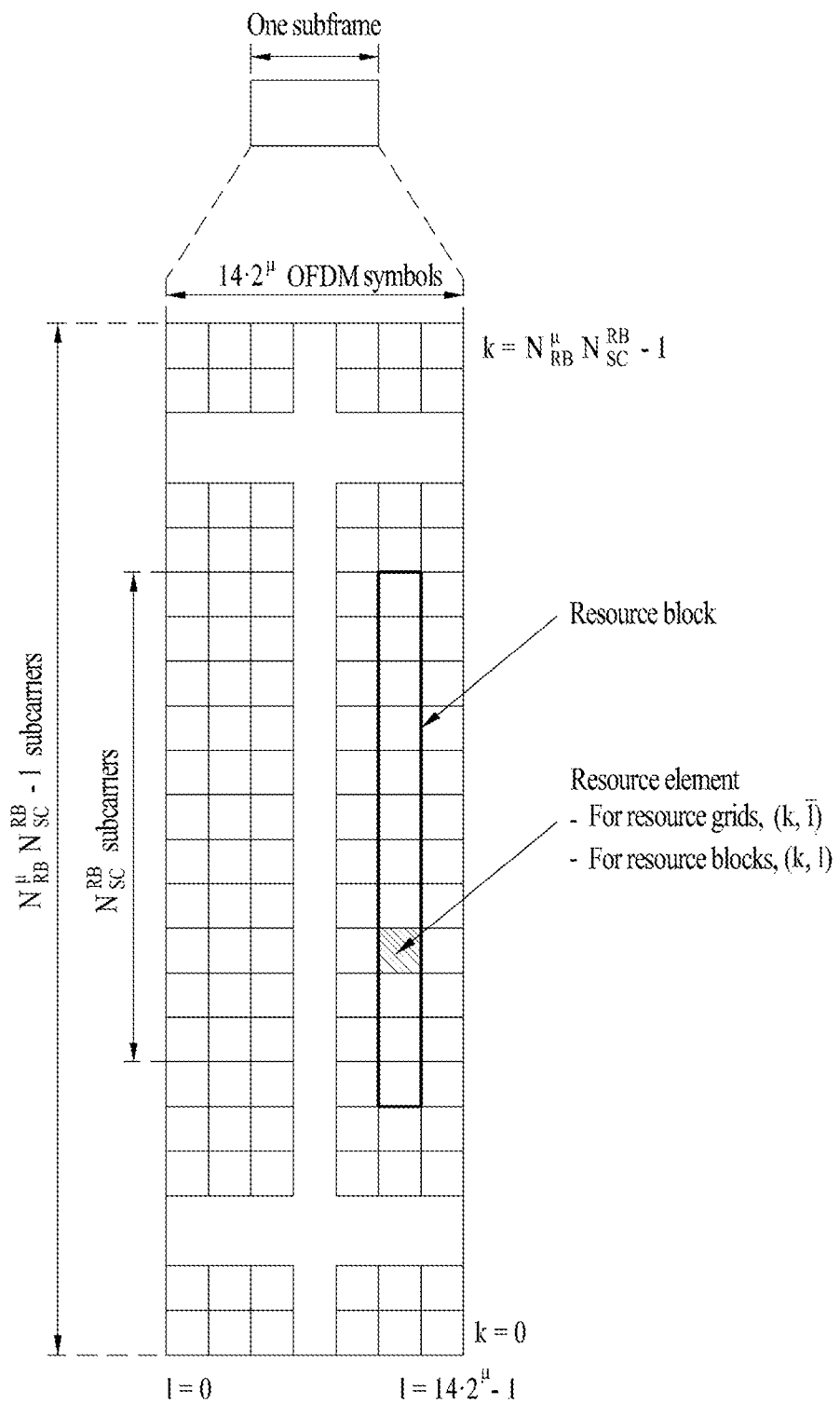
FIG. 9 illustrates an example of a resource grid in NR.

FIG. 9 illustrates an example of a resource grid in NR.

Referring to the resource grid of FIG. 9, there are $N_{RB}^{\mu} N_{sc}^{RB}$ subcarriers in the frequency domain, and there are $14 \cdot 2^{\mu}$ OFDM symbols in one subframe. However, the resource grid is merely exemplary and the present disclosure is not limited thereto. In the NR system, a transmitted signal is described by one or more resource grids, each including $N_{RB}^{\mu} N_{sc}^{RB}$ subcarriers, and $2^{\mu} N_{symb}^{(\mu)}$ OFDM symbols. In this case, $N_{RB}^{\mu} \leq N_{RB}^{max,\mu}$. $N_{RB}^{max,\mu}$ denotes the maximum transmission bandwidth and may change not only between numerologies but also between uplink and downlink. As shown in FIG. 9, one resource grid may be configured for each numerology $\mu$ and antenna port p. Each element of the resource grid for the numerology $\mu$ and antenna port p is referred to as a resource element, and it is uniquely identified by an index pair (k,l̄), where k is an index in the frequency domain (k=0, ..., $N_{RB}^{\mu} N_{sc}^{RB}-1$) and l̄ denotes the location of a symbol in the subframe (l̄=0, ..., $2^{\mu} N_{symb}^{(\mu)}-1$). The resource element (k,l̄) for the numerology $\mu$ and antenna port p corresponds to a complex value $a_{k,\bar{l}}^{(p,\mu)}$. When there is no risk of confusion or when a specific antenna port or numerology is not specified, the indexes p and $\mu$ may be dropped, and as a result, the complex value may be $a_{k,\bar{l}}^{(p)}$ or $a_{k,\bar{l}}$. In addition, a resource block (RB) is defined as $N_{sc}^{RB}=12$ consecutive subcarriers in the frequency domain.

Point A serves as a common reference point for resource block grids and may be obtained as follows.

OffsetToPointA for primary cell (PCell) downlink represents a frequency offset between point A and the lowest subcarrier of the lowest resource block in an SS/PBCH block used by the UE for initial cell selection. OffsetToPointA is expressed in the unit of resource block on the assumption of 15 kHz SCS for frequency range 1 (FR1) and 60 kHz SCS for frequency range 2 (FR2).

AbsoluteFrequencyPointA represents the frequency location of point A expressed as in absolute radio-frequency channel number (ARFCN).

Common resource blocks are numbered from 0 upwards in the frequency domain for SCS configuration $\mu$.

The center of subcarrier 0 of common resource block 0 for the SCS configuration $\mu$ is equivalent to point A.

The relation between a common RB number $n_{CRB}^{\mu}$ in the frequency domain and a resource element (k,l) for the SCS configuration $\mu$ is determined as shown in Equation 1.

$$n_{CRB}^{\mu} = \left\lfloor \frac{k}{N_{sc}^{RB}} \right\rfloor \quad \text{Equation 1]}$$

In Equation 1, k is defined relative to point A such that k=0 corresponds to a subcarrier centered on point A.

Physical resource blocks are defined within a bandwidth part (BWP) and numbered from 0 to $N_{BWP,i}^{size}-1$, where i denotes the number of the BWP.

The relationship between a physical resource block $n_{PRB}$ and a common resource block $n_{CRB}$ in BWP i is given by Equation 2.

$$n_{CRB} = n_{PRB} + N_{BWP,i}^{start} \quad \text{Equation 2}$$

In Equation 2, $N_{BWP,i}^{start}$ is a common resource block where the BWP starts relative to common resource block 0.

Figure 10:
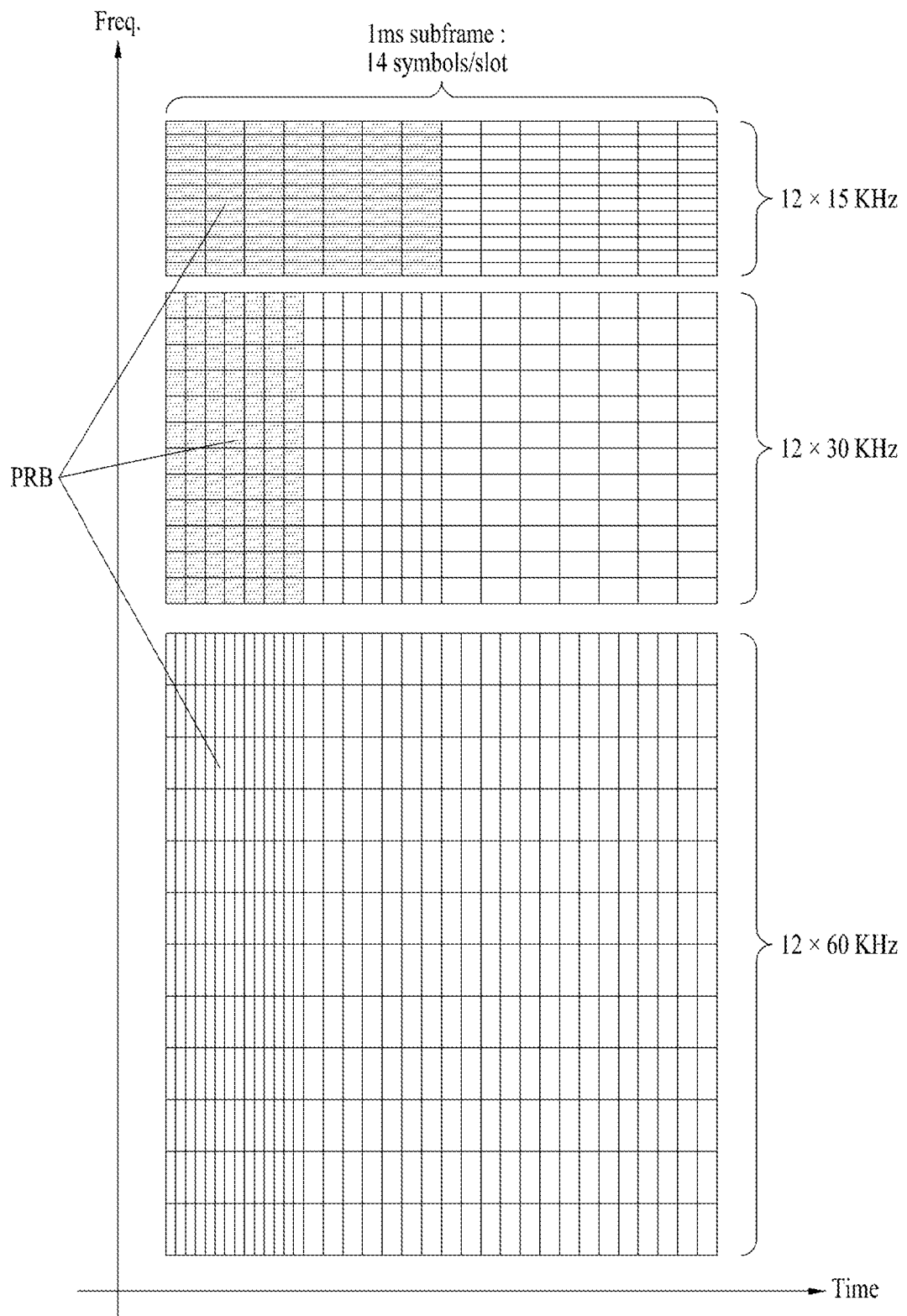
FIG. 10 illustrates an example of a physical resource block in NR.

FIG. 10 illustrates an example of a physical resource block in NR.

D. Wireless Communication Devices

Figure 11:
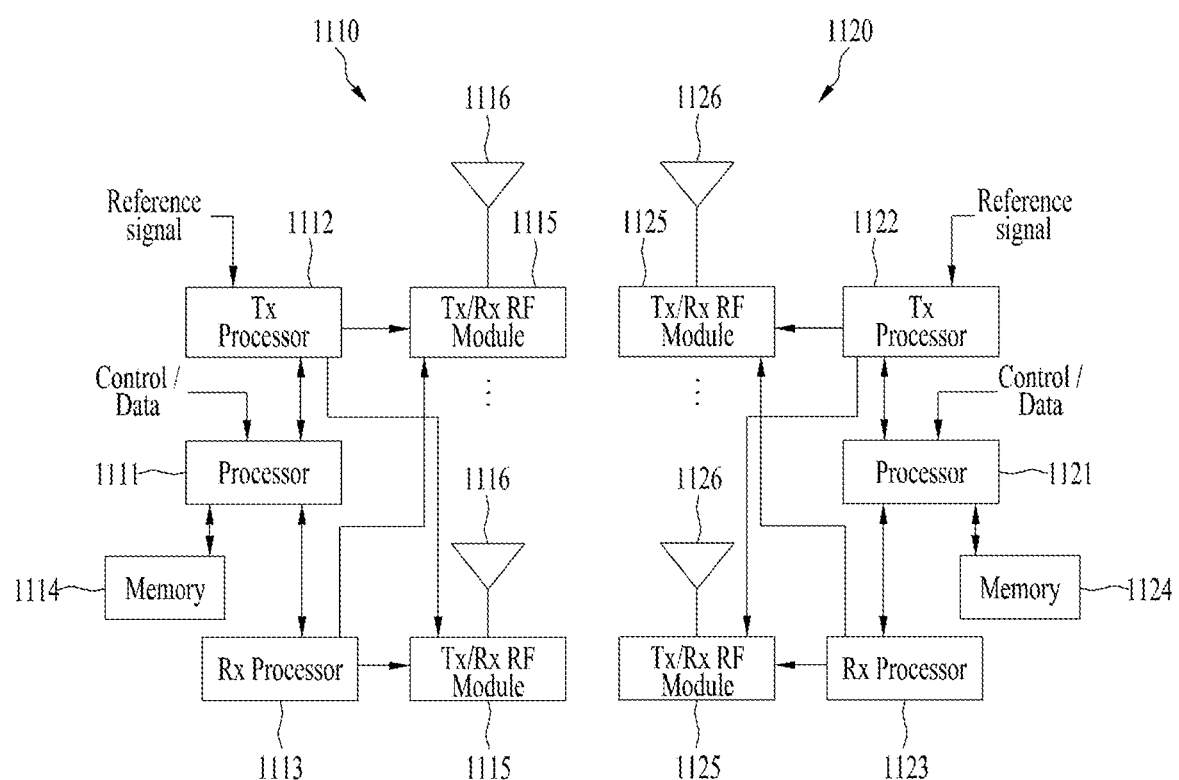
FIG. 11 illustrates a block diagram of a wireless communication apparatus to which the methods proposed in the present disclosure are applicable.

FIG. 11 illustrates a block diagram of a wireless communication apparatus to which the methods proposed in the present disclosure are applicable.

Referring to FIG. 11, a wireless communication system includes a base station 1110 and multiple UEs 1120 located within coverage of the base station 1110. The base station 1110 and the UE may be referred to as a transmitter and a receiver, respectively, and vice versa. The base station 1110 includes a processor 1111, a memory 1114, at least one transmission/reception (Tx/Rx) radio frequency (RF) module (or RF transceiver) 1115, a Tx processor 1112, an Rx processor 1113, and an antenna 1116. The UE 1120 includes a processor 1121, a memory 1124, at least one Tx/Rx RF module (or RF transceiver) 1125, a Tx processor 1122, an Rx processor 1123, and an antenna 1126. The processors are configured to implement the above-described functions, processes and/or methods. Specifically, the processor 1111 provides a higher layer packet from a core network for downlink (DL) transmission (communication from the base station to the UE). The processor implements the functionality of layer 2 (L2). In downlink (DL), the processor provides the UE 1120 with multiplexing between logical and transmission channels and radio resource allocation. That is, the processor is in charge of signaling to the UE. The Tx processor 1112 implements various signal processing functions of layer 1 (L1) (i.e., physical layers). The signal processing functions include facilitating the UE to perform forward error correction (FEC) and performing coding and interleaving. Coded and modulated symbols may be divided into parallel streams. Each stream may be mapped to an OFDM subcarrier, multiplexed with a reference signal (RS) in the time and/or frequency domain, and then combined together using an inverse fast Fourier transform (IFFT) to create a physical channel carrying a time domain OFDMA symbol stream. The OFDM stream is spatially precoded to produce multiple spatial streams. Each spatial stream may be provided to a different antenna 1116 through the Tx/Rx module (or transceiver) 1115. Each Tx/Rx module may modulate an RF carrier with each spatial stream for transmission. At the UE, each Tx/Rx module (or transceiver) 1125 receives a signal through each antenna 1126 thereof. Each Tx/Rx module recovers information modulated on the RF carrier and provides the information to the RX processor 1123. The Rx processor implements various signal processing functions of layer 1. The Rx processor may perform spatial processing on the information to recover any spatial streams toward the UE. If multiple spatial streams are destined for the UE, the multiple spatial streams may be combined by multiple Rx processors into a single OFDMA symbol stream. The RX processor converts the OFDMA symbol stream from the time domain to the frequency domain using a fast Fourier transform (FFT). A frequency-domain signal includes a separate OFDMA symbol stream for each subcarrier of an OFDM signal. The symbols and the reference signal on each subcarrier are recovered and demodulated by determining the most probable signal constellation points transmitted by the base station. Such soft decisions may be based on channel estimation values. The soft decisions are decoded and deinterleaved to recover data and control signals originally transmitted by the base station over the physical channel. The corresponding data and control signals are provided to the processor 1121.

Uplink (UL) transmission (communication from the UE to the base station) is processed by the base station 1110 in a similar way to that described in regard to the receiver functions of the UE 1120. Each Tx/Rx module (or transceiver) 1125 receives a signal through each antenna 1126. Each Tx/Rx module provides an RF carrier and information to the Rx processor 1123. The processor 1121 may be connected to the memory 1124 storing program codes and data. The memory may be referred to as a computer-readable medium.

E. Machine Type Communication (MTC)

The Machine Type Communication (MTC) refers to communication technology adopted by 3$^{rd}$ Generation Partnership Project (3GPP) to meet Internet of Things (IoT) service requirements. Since the MTC does not require high throughput, it may be used as an application for machine-to-machine (M2M) and Internet of Things (IoT).

The MTC may be implemented to satisfy the following requirements: (i) low cost and low complexity; (ii) enhanced coverage; and (iii) low power consumption.

The MTC was introduced in 3GPP release 10. Hereinafter, the MTC features added in each 3GPP release will be described.

The MTC load control was introduced in 3GPP releases 10 and 11.

The load control method prevents IoT (or M2M) devices from creating a heavy load on the base station suddenly.

Specifically, according to release 10, when a load occurs, the base station may disconnect connections with IoT devices to control the load. According to release 11, the base station may prevent the UE from attempting to establish a connection by informing the UE that access will become available through broadcasting such as SIB14.

In release 12, the features of low-cost MTC were added, and to this end, UE category 0 was newly defined. The UE category indicates the amount of data that the UE is capable of processing using a communication modem.

Specifically, a UE that belongs to UE category 0 may use a reduced peak data rate, a half-duplex operation with relaxed RF requirements, and a single reception antenna, thereby reducing the baseband and RF complexity of the UE.

In Release 13, enhanced MTC (eMTC) was introduced. In the eMTC, the UE operates in a bandwidth of 1.08 MHz, which is the minimum frequency bandwidth supported by legacy LTE, thereby further reducing the cost and power consumption.

Although the following description relates to the eMTC, the description is equally applicable to the MTC, 5G (or NR) MTC, etc. For convenience of description, all types of MTC is commonly referred to as 'MTC'.

In the following description, the MTC may be referred to as another terminology such as eMTC', 'bandwidth reduced low complexity/coverage enhanced (BL/CE)', 'non-BL UE (in enhanced coverage)', 'NR MTC', or 'enhanced BL/CE'. Further, the term "MTC" may be replaced with a term defined in the future 3GPP standards.

1) General Features of MTC (1) The MTC operates only in a specific system bandwidth (or channel bandwidth).

The specific system bandwidth may use 6 RBs of the legacy LTE as shown in Table 4 below and defined by considering the frequency range and subcarrier spacing (SCS) shown in Tables 5 to 7. The specific system bandwidth may be referred to as narrowband (NB). Here, the legacy LTE may encompass the contents described in the 3GPP standards expect the MTC. In the NR, the MTC may use RBs corresponding the smallest system bandwidth in Tables 6 and 7 as in the legacy LTE. Alternatively, the MTC may operate in at least one BWP or in a specific band of a BWP.

TABLE 4

| | Channel bandwidth BWChannel [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Table 5 shows the frequency ranges (FRs) defined for the NR.

TABLE 5

| Frequency range designation | Corresponding frequency range |
|---|---|
| FR1 | 450 MHz-6000 MHz |
| FR2 | 24250 MHz-52600 MHz |

Table 6 shows the maximum transmission bandwidth configuration (NRB) for the channel bandwidth and SCS in NR FR1.

TABLE 6

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 7 shows the maximum transmission bandwidth configuration (NRB) for the channel bandwidth and SCS in NR FR2.

TABLE 7

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

Hereinafter, the MTC narrowband (NB) will be described in detail.

The MTC follows narrowband operation to transmit and receive physical channels and signals, and the maximum channel bandwidth is reduced to 1.08 MHz or 6 (LTE) RBs.

The narrowband may be used as a reference unit for allocating resources to some downlink and uplink channels, and the physical location of each narrowband in the frequency domain may vary depending on the system bandwidth.

The 1.08 MHz bandwidth for the MTC is defined to allow an MTC UE to follow the same cell search and random access procedures as those of the legacy UE.

The MTC may be supported by a cell with a much larger bandwidth (e.g., 10 MHz), but the physical channels and signals transmitted/received in the MTC are always limited to 1.08 MHz.

The larger bandwidth may be supported by the legacy LTE system, NR system, 5G system, etc.

The narrowband is defined as 6 non-overlapping consecutive physical RBs in the frequency domain.

If $N_{NB}^{UL} \geq 4$, a wideband is defined as four non-overlapping narrowbands in the frequency domain. If $N_{NB}^{UL} < 4$, $N_{WB}^{UL} = 1$ and a single wideband is composed of $N_{NB}^{UL}$ non-overlapping narrowband(s).

For example, in the case of a 10 MHz channel, 8 non-overlapping narrowbands are defined.

Figure 12A:
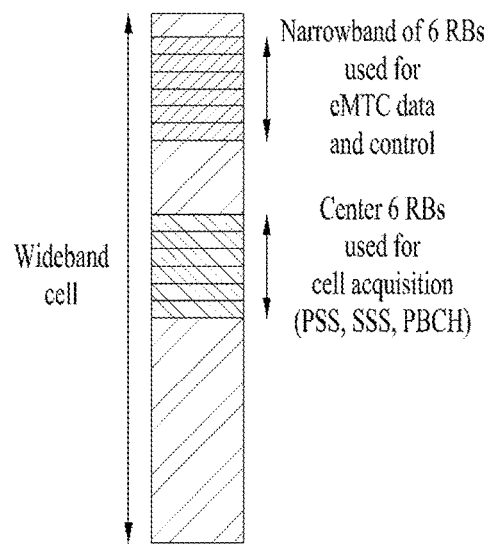
FIGS. 12A and 12B illustrate examples of narrowband operations and frequency diversity.
Figure 12B:
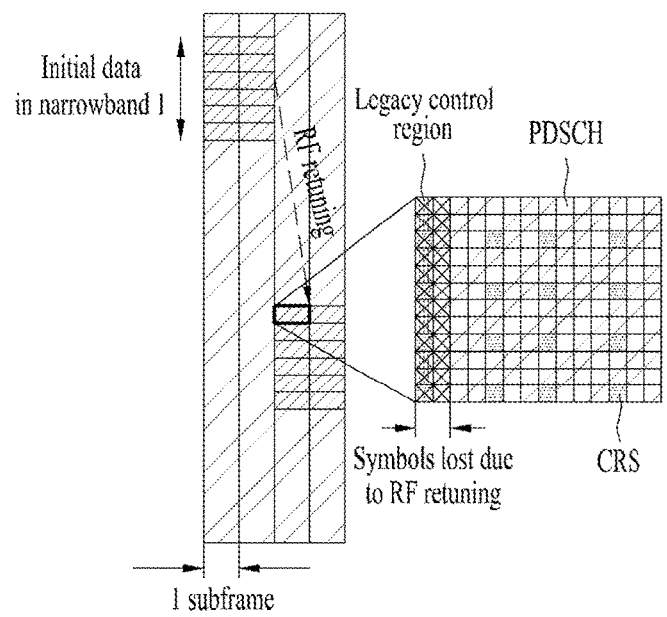

FIGS. 12A and 12B illustrate examples of narrowband operations and frequency diversity.

Specifically, FIG. 12A illustrates an example of the narrowband operation, and FIG. 12B illustrates an example of repetitions with RF retuning.

Hereinafter, frequency diversity by RF retuning will be described with reference to FIG. 12B.

The MTC supports limited frequency, spatial, and time diversity due to the narrowband RF, single antenna, and limited mobility. To reduce the effects of fading and outages, frequency hopping is supported between different narrowbands by the RF retuning.

The frequency hopping is applied to different uplink and downlink physical channels when repetition is enabled.

For example, if 32 subframes are used for PDSCH transmission, the first 16 subframes may be transmitted on the first narrowband. In this case, the RF front-end is retuned to another narrowband, and the remaining 16 subframes are transmitted on the second narrowband.

The MTC narrowband may be configured by system information or DCI.

(2) The MTC operates in half-duplex mode and uses limited (or reduced) maximum transmission power.

(3) The MTC does not use a channel (defined in the legacy LTE or NR) that should be distributed over the full system bandwidth of the legacy LTE or NR.

For example, the MTC does not use the following legacy LTE channels: PCFICH, PHICH, and PDCCH.

Thus, a new control channel, an MTC PDCCH (MPDCCH), is defined for the MTC since the above channels are not monitored.

The MPDCCH may occupy a maximum of 6 RBs in the frequency domain and one subframe in the time domain.

The MPDCCH is similar to an evolved PDCCH (EPDCCH) and supports a common search space for paging and random access.

In other words, the concept of the MPDCCH is similar to that of the EPDCCH used in the legacy LTE.

(4) The MTC uses newly defined DCI formats. For example, DCI formats 6-0A, 6-0B, 6-1A, 6-1B, 6-2, etc. may be used.

In the MTC, a physical broadcast channel (PBCH), physical random access channel (PRACH), MPDCCH, PDSCH, PUCCH, and PUSCH may be repeatedly transmitted. The MTC repeated transmission enables decoding of an MTC channel in a poor environment such as a basement, that is, when the signal quality or power is low, thereby increasing the radius of a cell or supporting the signal propagation effect. The MTC may support a limited number of transmission modes (TMs), which are capable of operating on a single layer (or single antenna), or support a channel or reference signal (RS), which are capable of operating on a single layer. For example, the MTC may operate in TM 1, 2, 6, or 9.

(6) In the MTC, HARQ retransmission is adaptive and asynchronous and performed based on a new scheduling assignment received on the MPDCCH.

(7) In the MTC, PDSCH scheduling (DCI) and PDSCH transmission occur in different subframes (cross-subframe scheduling).

(8) All resource allocation information (e.g., a subframe, a transport block size (TBS), a subband index, etc.) for SIB1 decoding is determined by a master information block (MIB) parameter (in the MTC, no control channel is used for the SIB1 decoding).

(9) All resource allocation information (e.g., a subframe, a TBS, a subband index, etc.) for SIB2 decoding is determined by several SIB1 parameters (in the MTC, no control channel is used for the SIB2 decoding).

(10) The MTC supports an extended discontinuous reception (DRX) cycle.

(11) The MTC may use the same primary synchronization signal/secondary synchronization signal/common reference signal (PSS/SSS/CRS) as that used in the legacy LTE or NR. In the NR, the PSS/SSS is transmitted in the unit of SS block (or SS/PBCH block or SSB), and a tracking RS (TRS) may be used for the same purpose as the CRS. That is, the TRS is a cell-specific RS and may be used for frequency/time tracking.

2) MTC Operation Mode and Level

Hereinafter, MTC operation modes and levels will be described. To enhance coverage, the MTC may be divided into two operation modes (first and second modes) and four different levels as shown in Table 8 below.

The MTC operation mode may be referred to CE mode. The first and second modes may be referred to CE mode A and CE mode B, respectively.

TABLE 8

| Mode | Level | Description |
|---|---|---|
| Mode A | Level 1 | No repetition for PRACH |
| | Level 2 | Small Number of Repetition for PRACH |
| Mode B | Level 3 | Medium Number of Repetition for PRACH |
| | Level 4 | Large Number of Repetition for PRACH |

The first mode is defined for small coverage where full mobility and channel state information (CSI) feedback are supported. In the first mode, the number of repetitions is zero or small. The operation in the first mode may have the same operation coverage as that of UE category 1. The second mode is defined for a UE with a very poor coverage condition where CSI feedback and limited mobility are supported. In the second mode, the number of times that transmission is repeated is large. The second mode provides up to 15 dB coverage enhancement with reference to the coverage of UE category 1. Each level of the MTC is defined differently in RACH and paging procedures.

Hereinafter, a description will be given of how to determine the MTC operation mode and level.

The MTC operation mode is determined by the base station, and each level is determined by the MTC UE. Specifically, the base station transmits RRC signaling including information for the MTC operation mode to the UE. The RRC signaling may include an RRC connection setup message, an RRC connection reconfiguration message, or an RRC connection reestablishment message. Here, the term "message" may refer to an information element (IE).

The MTC UE determines a level within the operation mode and transmits the determined level to the base station. Specifically, the MTC UE determines the level within the operation mode based on measured channel quality (e.g., RSRP, RSRQ, SINR, etc.) and informs the base station of the determined level using a PRACH resource (e.g., frequency, time, preamble, etc.).

3) MTC Guard Period

As described above, the MTC operates in the narrowband. The location of the narrowband may vary in each specific time unit (e.g., subframe or slot). The MTC UE tunes to a different frequency in every time unit. Thus, all frequency retuning may require a certain period of time. In other words, the guard period is required for transition from one time unit to the next time unit, and no transmission and reception occurs during the corresponding period.

The guard period varies depending on whether the current link is downlink or uplink and also varies depending on the state thereof. An uplink guard period (i.e., guard period defined for uplink) varies depending on the characteristics of data carried by a first time unit (time unit N) and a second time unit (time unit N+1). In the case of a downlink guard period, the following conditions need to be satisfied: (1) a first downlink narrowband center frequency is different from a second narrowband center frequency; and (2) in TDD, a first uplink narrowband center frequency is different from a second downlink center frequency.

The MTC guard period defined in the legacy LTE will be described. A guard period consisting of at most $N_{symb}^{retune}$ SC-FDMA symbols is created for Tx-Tx frequency retuning between two consecutive subframes. When the higher layer parameter ce-RetuningSymbols is configured, $N_{symb}^{retune}$ is equal to ce-RetuningSymbols. Otherwise, $N_{symb}^{retune}$ is 2. For an MTC UE configured with the higher layer parameter srs-UpPtsAdd, a guard period consisting of SC-FDMA symbols is created for Tx-Tx frequency retuning between a first special subframe and a second uplink subframe for frame structure type 2.

Figure 13:
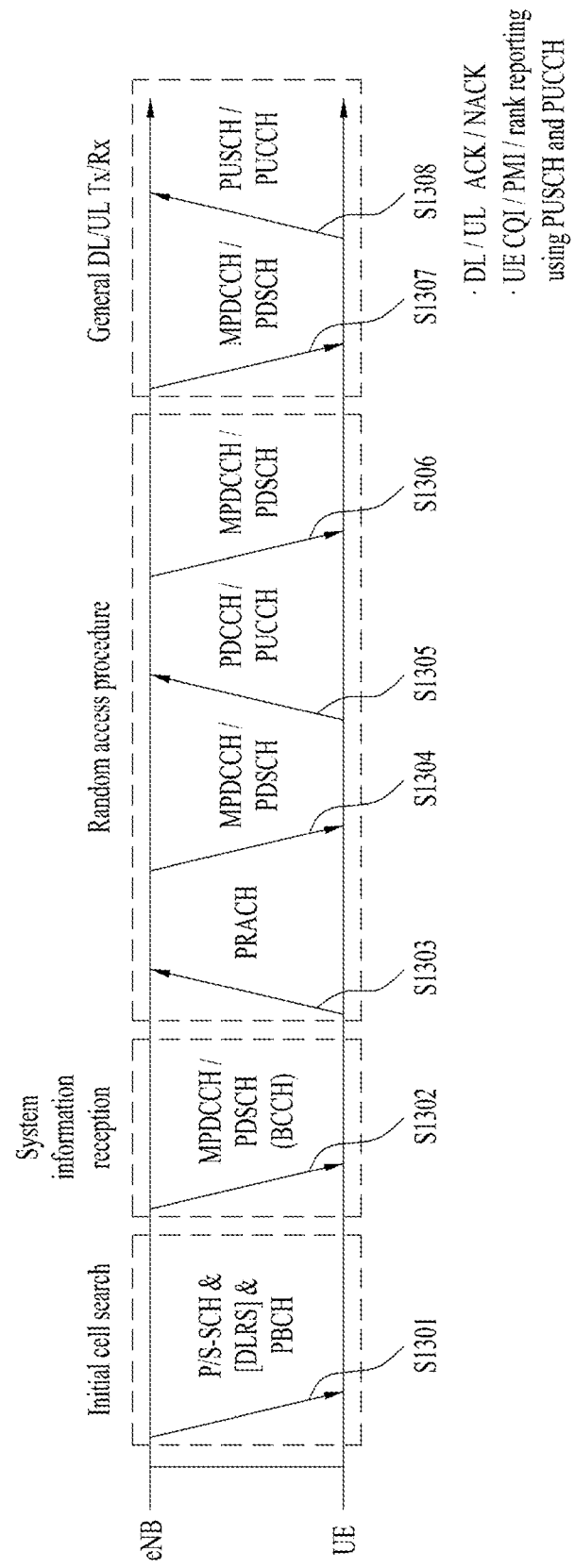
FIG. 13 illustrates physical channels available in MTC and a general signal transmission method using the same.

FIG. 13 illustrates physical channels available in MTC and a general signal transmission method using the same.

When an MTC UE is powered on or enters a new cell, the MTC UE performs initial cell search in step S1301. The initial cell search involves acquisition of synchronization with a base station. Specifically, the MTC UE synchronizes with the base station by receiving a primary synchronization signal (PSS) and a second synchronization signal (SSS) from the base station and obtains information such as a cell identifier (ID). The PSS/SSS used by the MTC UE for the initial cell search may be equal to a PSS/SSS or a resynchronization signal (RSS) of the legacy LTE.

Thereafter, the MTC UE may acquire broadcast information in the cell by receiving a PBCH signal from the base station.

During the initial cell search, the MTC UE may monitor the state of a downlink channel by receiving a downlink reference signal (DL RS). The broadcast information transmitted on the PBCH corresponds to the MIB. In the MTC, the MIB is repeated in the first slot of subframe #0 of a radio frame and other subframes (subframe #9 in FDD and subframe #5 in the TDD).

The PBCH repetition is performed such that the same constellation point is repeated on different OFDM symbols to estimate an initial frequency error before attempting PBCH decoding.

Figure 14A:
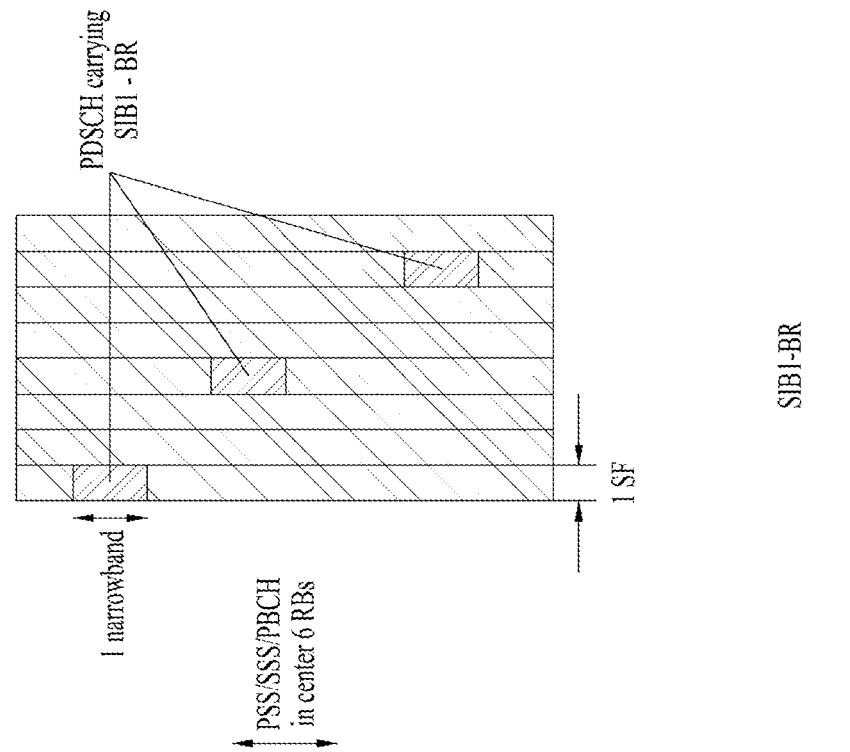
FIGS. 14A and 14B illustrate an example of system information transmissions in MTC.
Figure 14B:
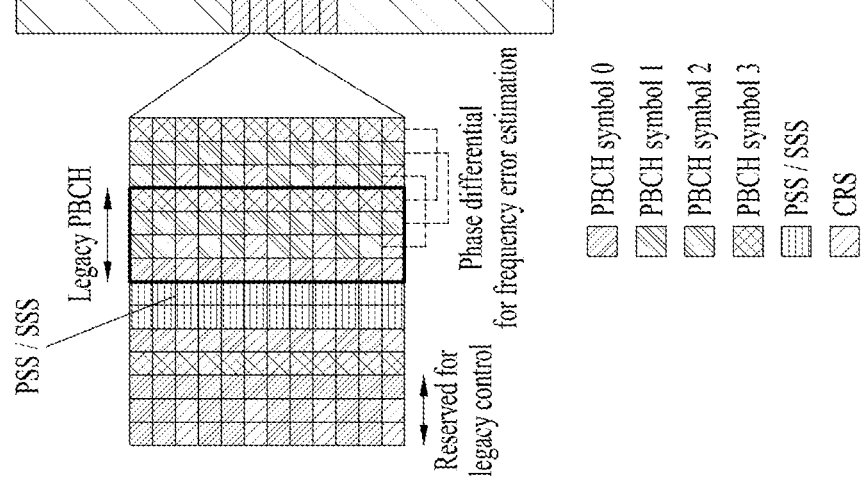

FIGS. 14A and 14B illustrate an example of system information transmissions in MTC.

Specifically, FIG. 14A illustrates an example of a repetition pattern for subframe #0 in FDD and a frequency error estimation method for a normal CP and repeated symbols, and FIG. 14B illustrates an example of transmission of an SIB-BR on a wideband LTE channel.

Five reserved bits in the MIB are used in the MTC to transmit scheduling information for a new system information block for bandwidth reduced device (SIB1-BR) including a time/frequency location and a TBS.

The SIB-BR is transmitted on a PDSCH directly without any related control channels.

The SIB-BR is maintained without change for 512 radio frames (5120 ms) to allow a large number of subframes to be combined.

Table 9 shows an example of the MIB.

TABLE 9

-- ASN1START
MasterInformationBlock ::=    SEQUENCE {
    dl-Bandwidth              ENUMERATED {
                                  n6, n15, n25, n50, n75,
                                  n100},
    phich-Config              PHICH-Config,
    systemFrameNumber         BIT STRING (SIZE (8)), TABLE 9-continued

```
schedulingInfoSIB1-BR-r13      INTEGER (0..31),
systemInfoUnchanged-BR-r15     BOOLEAN,
spare                          BIT STRING (SIZE (4))
}
-- ASN1STOP
```

In Table 9, the schedulingInfoSIB1-BR field indicates the index of a table that defines SystemInformationBlockType1-BR scheduling information. The zero value means that SystemInformationBlockType1-BR is not scheduled. The overall function and information carried by SystemInformationBlockType1-BR (or SIB1-BR) is similar to SIB1 of the legacy LTE. The contents of SIB1-BR may be categorized as follows: (1) PLMN; (2) cell selection criteria; and (3) scheduling information for SIB2 and other SIBs.

After completing the initial cell search, the MTC UE may acquire more detailed system information by receiving a MPDCCH and a PDSCH based on information in the MPDCCH in step S1302. The MPDCCH has the following features: (1) The MPDCCH is very similar to the EPDCCH; (2) The MPDCCH may be transmitted once or repeatedly (the number of repetitions is configured through higher layer signaling); (3) Multiple MPDCCHs are supported and a set of MPDCCHs are monitored by the UE; (4) The MPDCCH is generated by combining enhanced control channel elements (eCCEs), and each CCE includes a set of REs; and (5) the MPDCCH supports an RA-RNTI, SI-RNTI, P-RNTI, C-RNTI, temporary C-RNTI, and semi-persistent scheduling (SPS)C-RNTI.

To complete the access to the base station, the MTC UE may perform a random access procedure in steps S1303 to S1306. The basic configuration of an RACH procedure is carried by SIB2. SIB2 includes parameters related to paging. A paging occasion (PO) is a subframe in which the P-RNTI is capable of being transmitted on the MPDCCH. When a P-RNTI PDCCH is repeatedly transmitted, the PO may refer to a subframe where MPDCCH repetition is started. A paging frame (PF) is one radio frame, which may contain one or multiple POs. When DRX is used, the MTC UE monitors one PO per DRX cycle. A paging narrowband (PNB) is one narrowband, on which the MTC UE performs paging message reception.

To this end, the MTC UE may transmit a preamble on a PRACH (S1303) and receive a response message (e.g., random access response (RAR)) for the preamble on the MPDCCH and the PDSCH related thereto (S1304). In the case of contention-based random access, the MTC UE may perform a contention resolution procedure including transmission of an additional PRACH signal (S1305) and reception of a MPDCCH signal and a PDSCH signal related thereto (S1306). In the MTC, the signals and messages (e.g., Msg 1, Msg 2, Msg 3, and Msg 4) transmitted during the RACH procedure may be repeatedly transmitted, and a repetition pattern may be configured differently depending on coverage enhancement (CE) levels. Msg 1 may represent the PRACH preamble, Msg 2 may represent the RAR, Msg 3 may represent uplink transmission for the RAR at the MTC UE, and Msg 4 may represent downlink transmission for Msg 3 from the base station.

For random access, signaling of different PRACH resources and different CE levels is supported. This provides the same control of the near-far effect for the PRACH by grouping UEs that experience similar path loss together. Up to four different PRACH resources may be signaled to the MTC UE.

The MTC UE measures RSRP using a downlink RS (e.g., CRS, CSI-RS, TRS, etc.) and selects one of random access resources based on the measurement result. Each of four random access resources has an associated number of PRACH repetitions and an associated number of RAR repetitions.

Thus, the MTC UE in poor coverage requires a large number of repetitions so as to be detected by the base station successfully and needs to receive as many RARs as the number of repetitions such that the coverage levels thereof are satisfied.

The search spaces for RAR and contention resolution messages are defined in the system information, and the search space is independent for each coverage level.

A PRACH waveform used in the MTC is the same as that in the legacy LTE (for example, OFDM and Zadoff-Chu sequences).

After performing the above-described processes, the MTC UE may perform reception of an MPDCCH signal and/or a PDSCH signal (S1307) and transmission of a PUSCH signal and/or a PUCCH signal (S1308) as a normal uplink/downlink signal transmission procedure. Control information that the MTC UE transmits to the base station is commonly referred to as uplink control information (UCI). The UCI includes a HARQ-ACK/NACK, scheduling request, channel quality indicator (CQI), precoding matrix indicator (PMI), rank indicator (RI), etc.

When the MTC UE has established an RRC connection, the MTC UE blindly decodes the MPDCCH in a configured search space to obtain uplink and downlink data assignments.

In the MTC, all available OFDM symbols in a subframe are used to transmit DCI. Accordingly, time-domain multiplexing is not allowed between control and data channels in the subframe. Thus, the cross-subframe scheduling may be performed between the control and data channels as described above.

If the MPDCCH is last repeated in subframe #N, the MPDCCH schedules a PDSCH assignment in subframe #N+2.

DCI carried by the MPDCCH provides information for how many times the MPDCCH is repeated so that the MTC UE may know the number of repetitions when PDSCH transmission is started.

The PDSCH assignment may be performed on different narrowbands. Thus, the MTC UE may need to perform retuning before decoding the PDSCH assignment.

For uplink data transmission, scheduling follows the same timing as that of the legacy LTE. The last MPDCCH in subframe #N schedules PUSCH transmission starting in subframe #N+4.

Figure 15:
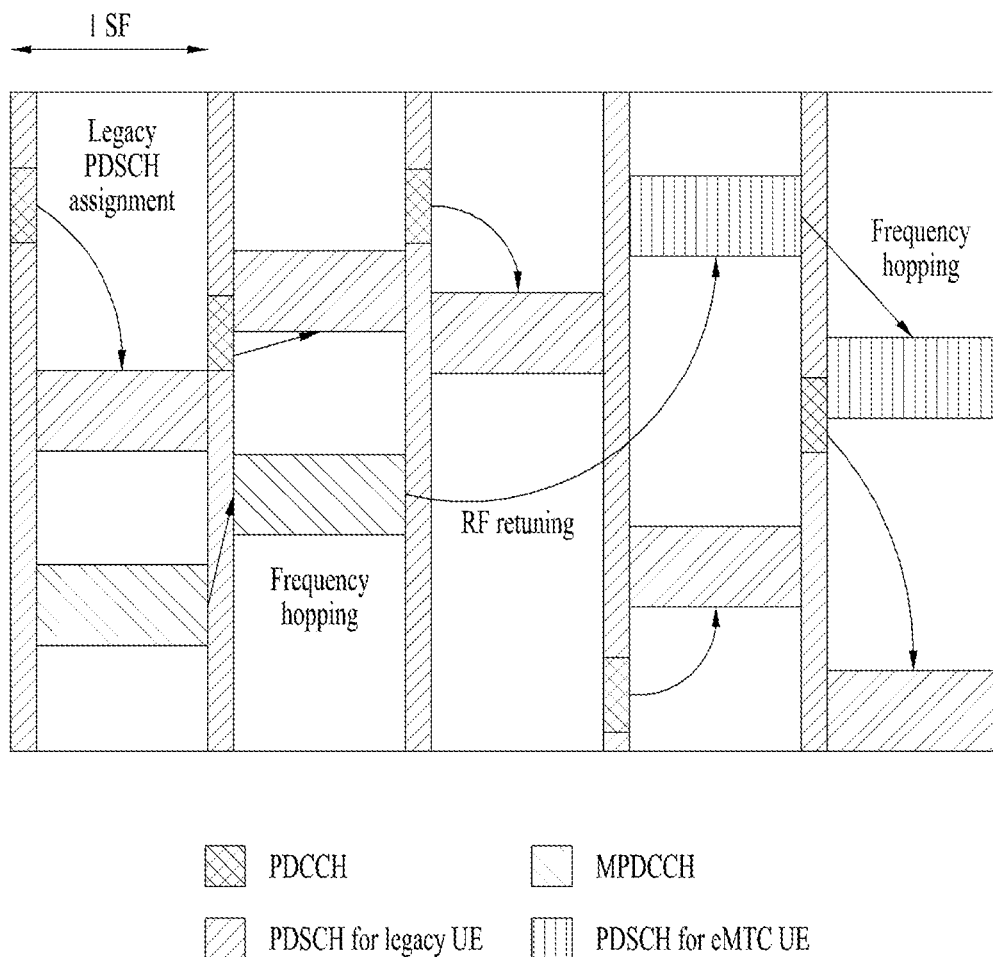
FIG. 15 illustrates an example of scheduling for each of MTC and legacy LTE.

FIG. 15 illustrates an example of scheduling for each of MTC and legacy LTE.

A legacy LTE assignment is scheduled using the PDCCH and uses the initial OFDM symbols in each subframe. The PDSCH is scheduled in the same subframe in which the PDCCH is received.

On the other hand, the MTC PDSCH is cross-subframe scheduled, and one subframe is defined between the MPDCCH and PDSCH to allow MPDCCH decoding and RF retuning.

MTC control and data channels may be repeated for a large number of subframes to be decoded in an extreme coverage condition. Specifically, the MTC control and data channels may be repeated for a maximum of 256 subframes for the MPDCCH and a maximum of 2048 subframes for the PDSCH F. Narrowband-Internet of Things (NB-IoT)

The NB-IoT may refer to a system for providing low complexity and low power consumption based on a system bandwidth (BW) corresponding to one physical resource block (PRB) of a wireless communication system (e.g., LTE system, NR system, etc.).

Herein, the NB-IoT may be referred to as another terminology such as 'NB-LTE', 'NB-IoT enhancement', 'further enhanced NB-IoT', or 'NB-NR'. The NB-IoT may be replaced with a term defined or to be defined in the 3GPP standards. For convenience of description, all types of NB-IoT is commonly referred to as 'NB-IoT'.

The NB-IoT may be used to implement the IoT by supporting an MTC device (or MTC UE) in a cellular system. Since one PRB of the system BW is allocated for the NB-IoT, frequency may be efficiently used. In addition, considering that in the NB-IoT, each UE recognizes a single PRB as one carrier, the PRB and carrier described herein may be considered to have the same meaning.

Although the present disclosure describes frame structures, physical channels, multi-carrier operation, operation modes, and general signal transmission and reception of the NB-IoT based on the LTE system, it is apparent that the present disclosure is applicable to the next-generation systems (e.g., NR system, etc.). In addition, the details of the NB-IoT described in the present disclosure may be applied to the MTC, which has similar purposes (e.g., low power, low cost, coverage enhancement, etc.).

1) Frame Structure and Physical Resource of NB-IoT

The NB-IoT frame structure may vary depending on subcarrier spacing.

Figure 16:
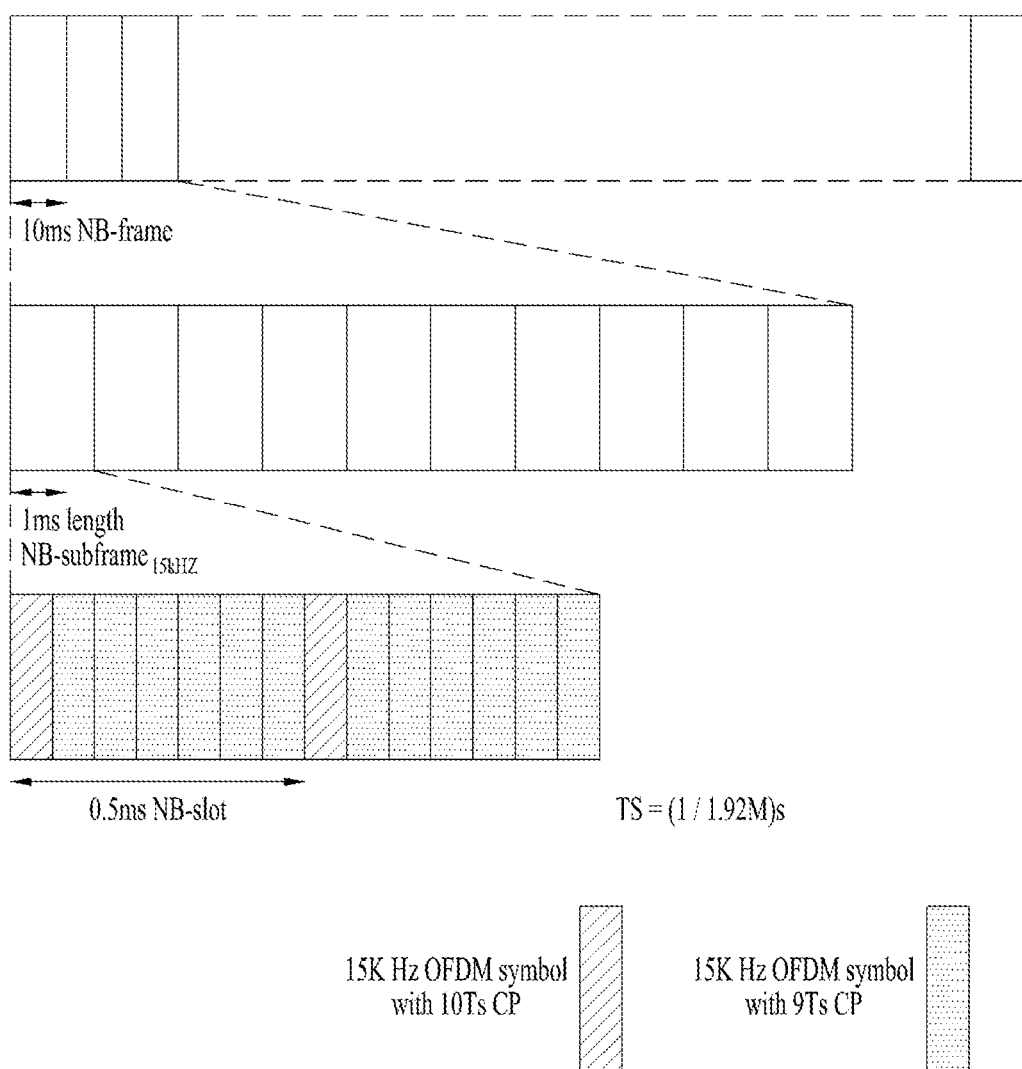
FIGS. 16 and 17 illustrate examples of NB-IoT frame structures according to subcarrier spacing.
Figure 17:
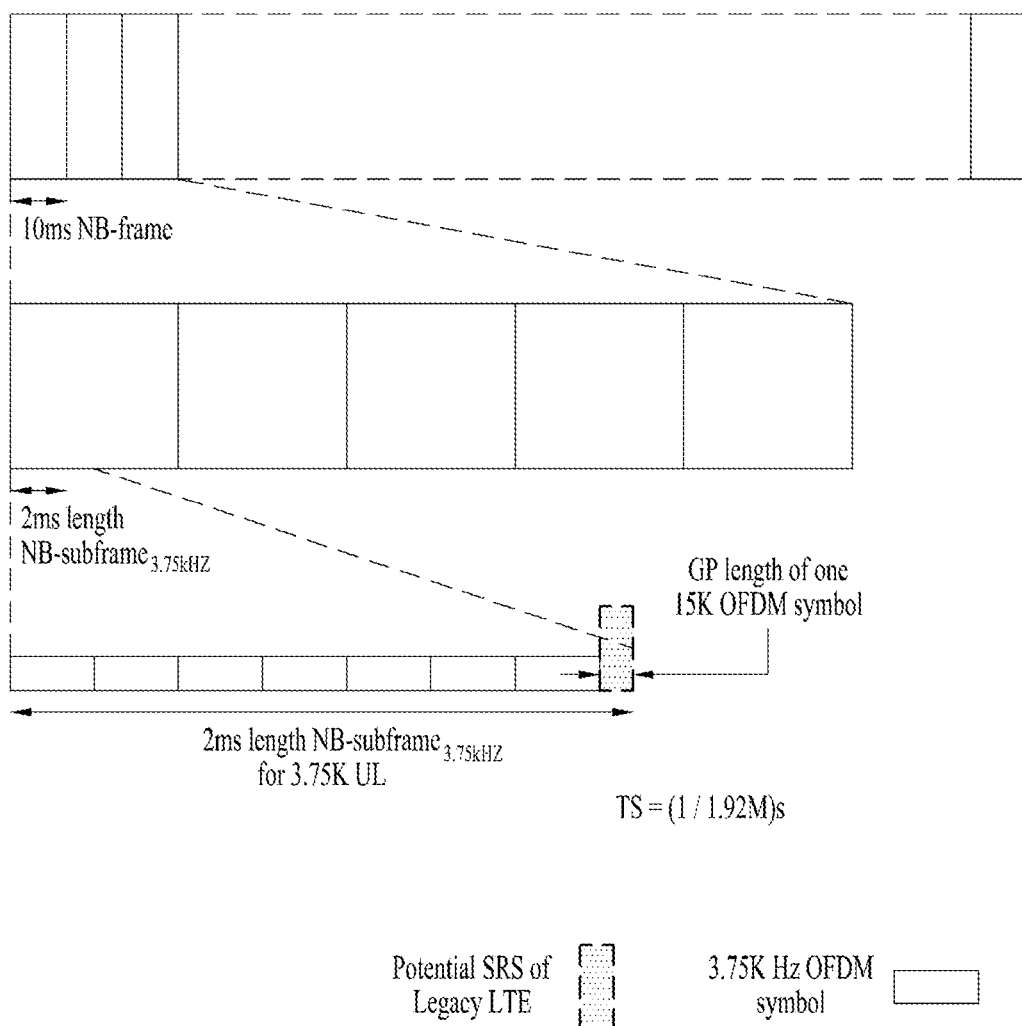

FIGS. 16 and 17 illustrate examples of NB-IoT frame structures according to subcarrier spacing (SCS). Specifically, FIG. 16 illustrates a frame structure with SCS of 15 kHz, and FIG. 17 illustrates a frame structure with SCS of 3.75 kHz. However, the NB-IoT frame structure is not limited thereto, and different SCS (e.g., 30 kHz, etc.) may be applied to the NB-IoT by changing the time/frequency unit.

Although the present disclosure describes the NB-IoT frame structure based on the LTE frame structure, this is merely for convenience of description and the present disclosure is not limited thereto. That is, the embodiments of the present disclosure are applicable to the NB-IoT based on the frame structure of the next-generation system (e.g., NR system).

Referring to FIG. 16, the NB-IoT frame structure for the 15 kHz subcarrier spacing is the same as the frame structure of the legacy system (LTE system). Specifically, a 10 ms NB-IoT frame may include 10 NB-IoT subframes of 1 ms each, and the 1 ms NB-IoT subframe may include two NB-IoT slots, each having a duration of 0.5 ms. Each 0.5 ms NB-IoT slot ms may include 7 OFDM symbols.

Referring to FIG. 17, a 10 ms NB-IoT frame may include five NB-IoT subframes of 2 ms each, and the 2 ms NB-IoT subframe may include 7 OFDM symbols and one guard period (GP). The 2 ms NB-IoT subframe may be expressed as an NB-IoT slot or an NB-IoT resource unit (RU).

Hereinafter, downlink and uplink physical resources for the NB-IoT will be described.

The NB-IoT downlink physical resource may be configured based on physical resources of other communication systems (e.g., LTE system, NR system, etc.) except that the system BW is composed of a specific number of RBs (e.g., one RB=180 kHz). For example, when NB-IoT downlink supports only the 15 kHz subcarrier spacing as described above, the NB-IoT downlink physical resource may be configured by limiting the resource grid of the LTE system illustrated in FIG. 6 to one RB (i.e., one PRB) in the frequency domain.

Figure 18:
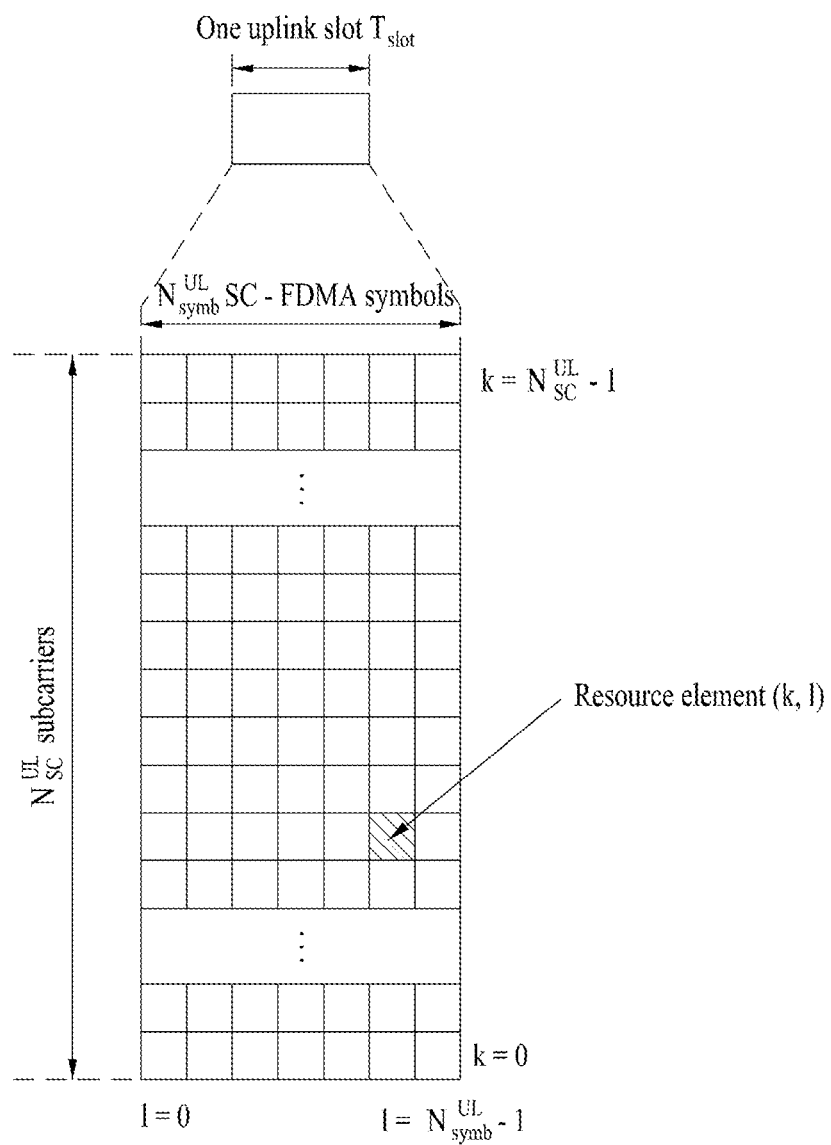
FIG. 18 illustrates an example of the resource grid for NB-IoT UL.

The NB-IoT uplink physical resource may be configured by limiting to the system bandwidth to one RB as in the NB-IoT downlink. For example, when NB-IoT uplink supports the 15 kHz and 3.75 kHz subcarrier spacing as described above, a resource grid for the NB-IoT uplink may be represented as shown in FIG. 18. The number of subcarriers $N_{sc}^{UL}$ and the slot period $T_{slot}$ may be given in Table 10 below.

FIG. 18 illustrates an example of the resource grid for NB-IoT uplink.

TABLE 10

| Subcarrier spacing | $N_{sc}^{UL}$ | $T_{slot}$ |
|---|---|---|
| Δf = 3.75 kHz | 48 | 61440 · $T_s$ |
| Δf = 15 kHz | 12 | 15360 · $T_s$ |

A resource unit (RU) for the NB-IoT uplink may include SC-FDMA symbols in the time domain and $N_{symb}^{UL} N_{slots}^{UL}$ consecutive subcarriers in the frequency domain. In frame structure type 1 (i.e., FDD), the values of $N_{sc}^{RU}$ and $N_{symb}^{UL}$ may be given in Table 11 below. In frame structure type 2 (i.e., TDD), the values of $N_{sc}^{RU}$ and $N_{symb}^{UL}$ may be given in Table 12.

TABLE 11

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

TABLE 12

| NPUSCH format | Δf | Supported uplink-downlink configurations | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

2) Physical Channels of NB-IoT

A base station and/or UE that support the NB-IoT may be configured to transmit and receive physical channels and signals different from those in the legacy system. Hereinafter, the physical channels and/or signals supported in the NB-IoT will be described in detail.

First, the NB-IoT downlink will be described. For the NB-IoT downlink, an OFDMA scheme with the 15 kHz subcarrier spacing may be applied. Accordingly, orthogonality between subcarriers may be provided, thereby supporting coexistence with the legacy system (e.g., LTE system, NR system, etc.).

To distinguish the physical channels of the NB-IoT system from those of the legacy system, 'N (narrowband)' may be added. For example, DL physical channels may be defined as follows: 'narrowband physical broadcast channel (NPBCH)', 'narrowband physical downlink control channel (NPDCCH)', 'narrowband physical downlink shared channel (NPDSCH)', etc. DL physical signals may be defined as follows: 'narrowband primary synchronization signal (NPSS)', 'narrowband secondary synchronization signal (NSSS)', 'narrowband reference signal (NRS)', 'narrowband positioning reference signal (NPRS)', 'narrowband wake-up signal (NWUS)', etc.

Generally, the above-described downlink physical channels and physical signals for the NB-IoT may be configured to be transmitted based on time-domain multiplexing and/or frequency-domain multiplexing.

The NPBCH, NPDCCH, and NPDSCH, which are downlink channels of the NB-IoT system, may be repeatedly transmitted for coverage enhancement.

The NB-IoT uses newly defined DCI formats. For example, the DCI formats for the NB-IoT may be defined as follows: DCI format N0, DCI format N1, DCI format N2, etc.

Next, the NB-IoT uplink will be described. For the NB-IoT uplink, an SC-FDMA scheme with the subcarrier spacing of 15 kHz or 3.75 kHz may be applied. The NB-IoT uplink may support multi-tone and single-tone transmissions. For example, the multi-tone transmission may support the 15 kHz subcarrier spacing, and the single-tone transmission may support both the 15 kHz and 3.75 kHz subcarrier spacing.

In the case of the NB-IoT uplink, 'N (narrowband)' may also be added to distinguish the physical channels of the NB-IoT system from those of the legacy system, similarly to the NB-IoT downlink. For example, uplink physical channels may be defined as follows: 'narrowband physical random access channel (NPRACH)', 'narrowband physical uplink shared channel (NPUSCH)', etc. UL physical signals may be defined as follows: 'narrowband demodulation reference signal (NDMRS)'.

The NPUSCH may be configured with NPUSCH format 1 and NPUSCH format 2. For example, NPUSCH format 1 is used for UL-SCH transmission (or transfer), and NPUSCH format 2 may be used for UCI transmission such as HARQ ACK signaling.

The NPRACH, which is a downlink channel of the NB-IoT system, may be repeatedly transmitted for coverage enhancement. In this case, frequency hopping may be applied to the repeated transmission.

3) Multi-Carrier Operation in NB-IoT

Hereinafter, the multi-carrier operation in the NB-IoT will be described. The multi-carrier operation may mean that when the base station and/or UE uses different usage of multiple carriers (i.e., different types of multiple carriers) in transmitting and receiving a channel and/or a signal in the NB-IoT.

In general, the NB-IoT may operate in multi-carrier mode as described above. In this case, NB-IoT carriers may be divided into an anchor type carrier (i.e., anchor carrier or anchor PRB) and a non-anchor type carrier (i.e., non-anchor carrier or non-anchor PRB).

From the perspective of the base station, the anchor carrier may mean a carrier for transmitting the NPDSCH that carries the NPSS, NSSS, NPBCH, and SIB (N-SIB) for initial access. In other words, in the NB-IoT, the carrier for initial access may be referred to as the anchor carrier, and the remaining carrier(s) may be referred to as the non-anchor carrier. In this case, there may be one or multiple anchor carriers in the system.

4) Operation Mode of NB-IoT

Figure 19A:
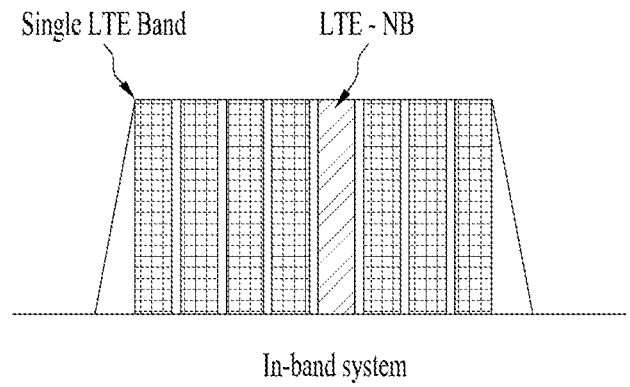
FIGS. 19A to 19C illustrate an examples of operation modes supported in the NB-IoT system.
Figure 19B:
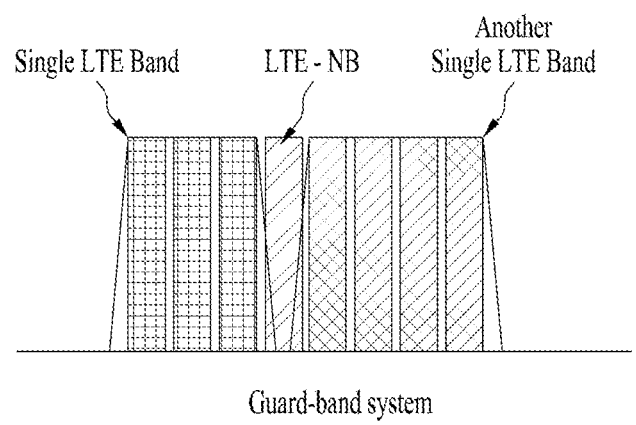
Figure 19C:
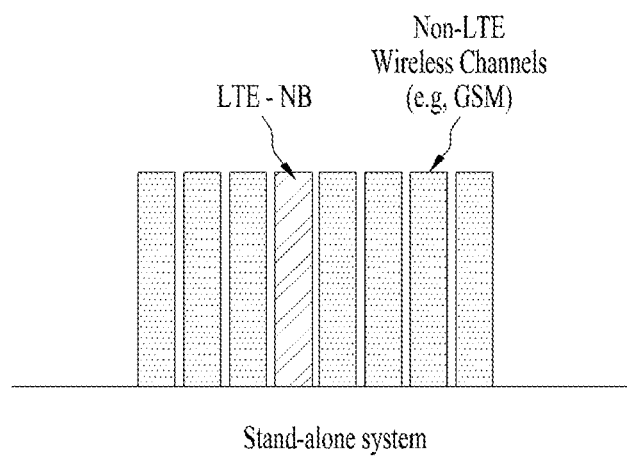

The operation mode of the NB-IoT will be described. The NB-IoT system may support three operation modes. FIGS. 19A to 19C illustrate an examples of operation modes supported in the NB-IoT system. Although the present disclosure describes the NB-IoT operation mode based on the LTE band, this is merely for convenience of description and the present disclosure is also applicable to other system bands (e.g., NR system band).

FIG. 19A illustrates an in-band system, FIG. 19B illustrates a guard-band system, and FIG. 19C illustrates a stand-alone system. The in-band system, guard-band system, and stand-alone system may be referred to as in-band mode, guard-band mode, and stand-alone mode, respectively.

The in-band system may mean a system or mode that uses one specific RB (PRB) in the legacy LTE band for the NB-IoT. To operate the in-band system, some RBs of the LTE system carrier may be allocated.

The guard-band system may mean a system or mode that uses a space reserved for the guard band of the legacy LTE band for the NB-IoT. To operate the guard-band system, the guard band of the LTE carrier which is not used as the RB in the LTE system may be allocated. For example, the legacy LTE band may be configured such that each LTE band has the guard band of minimum 100 kHz at the end thereof. In order to use 200 kHz, two non-contiguous guard bands may be used.

The in-band system and the guard-band system may operate in a structure where the NB-IoT coexists in the legacy LTE band.

Meanwhile, the stand-alone system may mean a system or mode independent from the legacy LTE band. To operate the stand-alone system, a frequency band (e.g., reallocated GSM carrier) used in a GSM EDGE radio access network (GERAN) may be separately allocated.

The above three operation modes may be applied independently, or two or more operation modes may be combined and applied.

5) General Signal Transmission and Reception Procedure in NB-IoT

Figure 20:
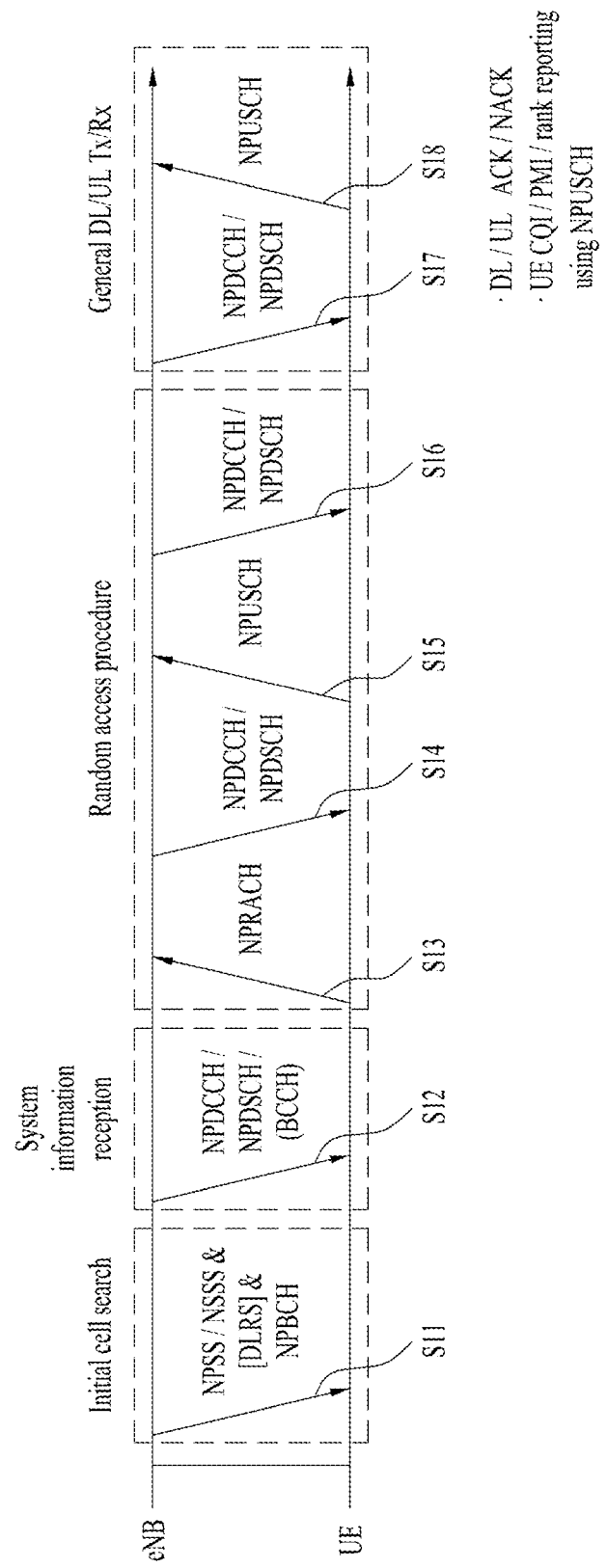
FIG. 20 illustrates an example of physical channels available in the NB-IoT and a general signal transmission method using the same.

FIG. 20 illustrates an example of physical channels available in the NB-IoT and a general signal transmission method using the same. In a wireless communication system, an NB-IoT UE may receive information from a base station in downlink (DL) and transmit information to the base station in uplink (UL). In other words, the base station may transmit the information to the NB-IoT UE in downlink and receive the information from the NB-IoT UE in uplink in the wireless communication system.

Information transmitted and received between the base station and the NB-IoT UE may include various data and control information, and various physical channels may be used depending on the type/usage of information transmitted and received therebetween. The NB-IoT signal transmission and reception method described with reference to FIG. 20 may be performed by the aforementioned wireless communication apparatuses (e.g., base station and UE in FIG. 11).

When the NB-IoT UE is powered on or enters a new cell, the NB-IoT UE may perform initial cell search (S11). The initial cell search involves acquisition of synchronization with the base station. Specifically, the NB-IoT UE may synchronize with the base station by receiving an NPSS and an NSSS from the base station and obtain information such as a cell ID. Thereafter, the NB-IoT UE may acquire information broadcast in the cell by receiving an NPBCH from the base station. During the initial cell search, the NB-IoT UE may monitor the state of a downlink channel by receiving a downlink reference signal (DL RS).

In other words, when the NB-IoT UE enters the new cell, the BS may perform the initial cell search, and more particularly, the base station may synchronize with the UE. Specifically, the base station may synchronize with the NB-IoT UE by transmitting the NPSS and NSSS to the UE and transmit the information such as the cell ID. The base station may transmit the broadcast information in the cell by transmitting (or broadcasting) the NPBCH to the NB-IoT UE. The BS may transmit the DL RS to the NB-IoT UE during the initial cell search to check the downlink channel state.

After completing the initial cell search, the NB-IoT UE may acquire more detailed system information by receiving a NPDCCH and a NPDSCH related to thereto (S12). In other words, after the initial cell search, the base station may transmit the more detailed system information by transmitting the NPDCCH and the NPDSCH related to thereto to the NB-IoT UE.

Thereafter, the NB-IoT UE may perform a random access procedure to complete the access to the base station (S13 to S16).

Specifically, the NB-IoT UE may transmit a preamble on an NPRACH (S13). As described above, the NPRACH may be repeatedly transmitted based on frequency hopping for coverage enhancement. In other words, the base station may (repeatedly) receive the preamble from the NB-IoT UE over the NPRACH.

Then, the NB-IoT UE may receive a random access response (RAR) for the preamble from the base station on the NPDCCH and the NPDSCH related thereto (S14). That is, the base station may transmit the random access response (RAR) for the preamble to the base station on the NPDCCH and the NPDSCH related thereto.

The NB-IoT UE may transmit an NPUSCH using scheduling information in the RAR (S15) and perform a contention resolution procedure based on the NPDCCH and the NPDSCH related thereto (S16). That is, the base station may receive the NPUSCH from the NB-IoT UE based on the scheduling information in the RAR and perform the contention resolution procedure.

After performing the above-described processes, the NB-IoT UE may perform NPDCCH/NPDSCH reception (S17) and NPUSCH transmission (S18) as a normal UL/DL signal transmission procedure. After the above-described processes, the base station may transmit the NPDCCH/NPDSCH to the NB-IoT UE and receive the NPUSCH from the NB-IoT UE during the normal uplink/downlink signal transmission procedure.

In the NB-IoT, the NPBCH, NPDCCH, NPDSCH, etc. may be repeatedly transmitted for the coverage enhancement as described above. In addition, UL-SCH (normal uplink data) and UCI may be transmitted on the NPUSCH. In this case, the UL-SCH and UCI may be configured to be transmitted in different NPUSCH formats (e.g., NPUSCH format 1, NPUSCH format 2, etc.)

As described above, the UCI means control information transmitted from the UE to the base station. The UCI may include the HARQ ACK/NACK, scheduling request (SR), CSI, etc. The CSI may include the CQI, PMI, RI, etc. Generally, the UCI may be transmitted over the NPUSCH in the NB-IoT as described above. In particular, the UE may transmit the UCI on the NPUSCH periodically, aperiodically, or semi-persistently according to the request/indication from the network (e.g., base station).

6) Initial Access Procedure in NB-IoT

The procedure in which the NB-IoT UE initially accesses the BS is briefly described in the section "General Signal Transmission and Reception Procedure in NB-IoT". Specifically, the above procedure may be subdivided into a procedure in which the NB-IoT UE searches for an initial cell and a procedure in which the NB-IoT UE obtains system information.

Figure 21:
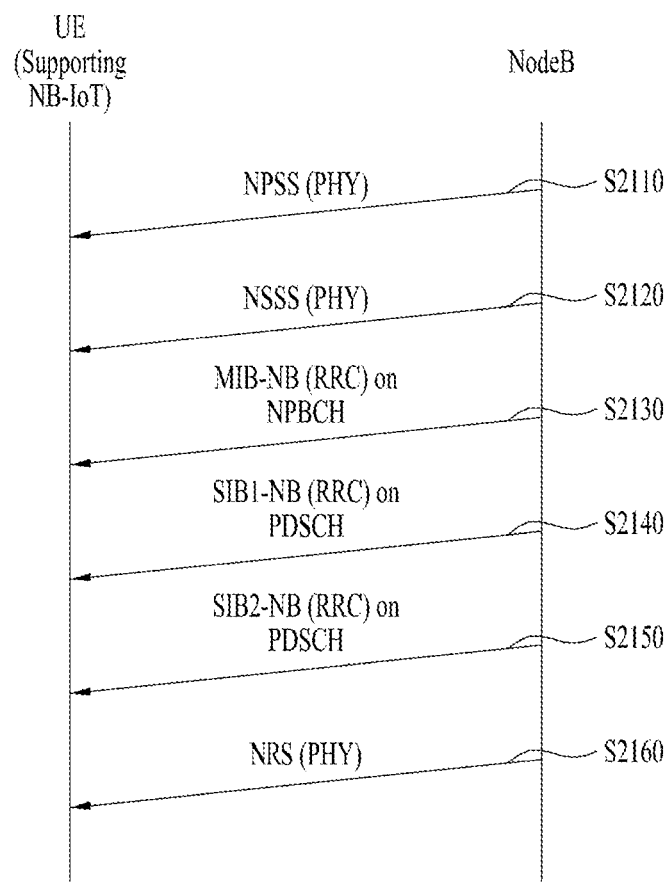
FIG. 21 illustrates an example of the initial access procedure in the NB-IoT.

FIG. 21 illustrates a particular procedure for signaling between a UE and a BS (e.g., NodeB, eNodeB, eNB, gNB, etc.) for initial access in the NB-IoT. In the following, a normal initial access procedure, an NPSS/NSSS configuration, and acquisition of system information (e.g., MIB, SIB, etc.) in the NB-IoT will be described with reference to FIG. 21.

FIG. 21 illustrates an example of the initial access procedure in the NB-IoT. The name of each physical channel and/or signal may vary depending on the wireless communication system to which the NB-IoT is applied. For example, although the NB-IoT based on the LTE system is considered in FIG. 21, this is merely for convenience of description and details thereof are applicable to the NB-IoT based on the NR system. The details of the initial access procedure are also applicable to the MTC.

Referring to FIG. 21, the NB-IoT UE may receive a narrowband synchronization signal (e.g., NPSS, NSSS, etc.) from the base station (S2110 and S2120). The narrowband synchronization signal may be transmitted through physical layer signaling.

The NB-IoT UE may receive a master information block (MIB) (e.g., MIB-NB) from the base station on an NPBCH (S2130). The MIB may be transmitted through higher layer signaling (e.g., RRC signaling).

The NB-IoT UE may receive a system information block (SIB) from the base station on an NPDSH (S2140 and S2150). Specifically, the NB-IoT UE may receive SIB1-NB, SIB2-NB, etc. on the NPDSCH through the higher layer signaling (e.g., RRC signaling). For example, SIB1-NB may refer to system information with high priority among SIBs, and SIB2-NB may refer to system information with lower priority than SIB1-NB.

The NB-IoT may receive an NRS from the BS (S2160), and this operation may be performed through physical layer signaling.

7) Random Access Procedure in NB-IoT

The procedure in which the NB-IoT UE performs random access to the base station is briefly described in the section "General Signal Transmission and Reception Procedure in NB-IoT". Specifically, the above procedure may be subdivided into a procedure in which the NB-IoT UE transmits a preamble to the base station and a procedure in which the NB-IoT receives a response for the preamble.

Figure 22:
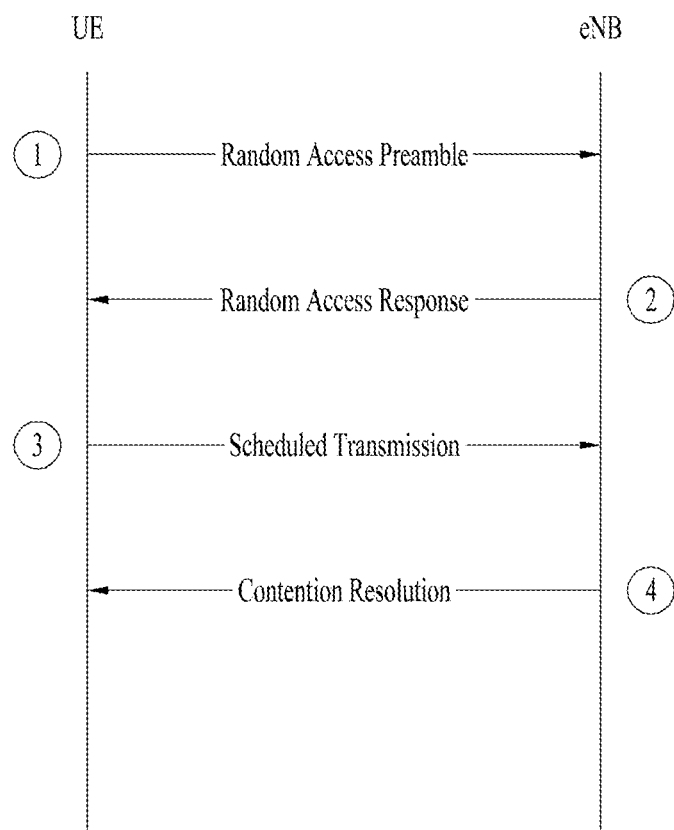
FIG. 22 illustrates an example of the random access procedure in the NB-IoT.

FIG. 22 illustrates a particular procedure for signaling between a UE and a base station (e.g., NodeB, eNodeB, eNB, gNB, etc.) for random access in the NB-IoT. In the following, detail of the random access procedure in the NB-IoT will be described based on messages (e.g., msg1, msg2, msg3, msg4) used therefor.

FIG. 22 illustrates an example of the random access procedure in the NB-IoT. The name of each physical channel, physical signal, and/or message may vary depending on the wireless communication system to which the NB-IoT is applied. For example, although the NB-IoT based on the LTE system is considered in FIG. 22, this is merely for convenience of description and details thereof are applicable to the NB-IoT based on the NR system. The details of the initial access procedure are also applicable to the MTC.

Referring to FIG. 22, the NB-IoT may be configured to support contention-based random access.

First, the NB-IoT UE may select an NPRACH resource based on the coverage level of the corresponding UE. The NB-IoT UE may transmit a random access preamble (i.e., message 1, msg1) to the base station on the selected NPRACH resource.

The NB-IoT UE may monitor an NPDCCH search space to search for an NPDCCH for DCI scrambled with an RA-RNTI (e.g., DCI format N1). Upon receiving the NPDCCH for the DCI scrambled with the RA-RNTI, the UE may receive an RAR (i.e., message 2, msg2) from the base station on an NPDSCH related to the NPDCCH. The NB-IoT UE may obtain a temporary identifier (e.g., temporary C-RNTI), a timing advance (TA) command, etc. from the RAR. In addition, the RAR may also provide an uplink grant for a scheduled message (i.e., message 3, msg3).

To start a contention resolution procedure, the NB-IoT UE may transmit the scheduled message to the base station. Then, the base station may transmit an associated contention resolution message (i.e., message 4, msg4) to the NB-IoT UE in order to inform that the random access procedure is successfully completed.

By doing the above, the base station and the NB-IoT UE may complete the random access.

8) DRX Procedure in NB-IoT

While performing the general signal transmission and reception procedure of the NB-IoT, the NB-IoT UE may transit to an idle state (e.g., RRC IDLE state) and/or an inactive state (e.g., RRC INACTIVE state) to reduce power consumption. The NB-IoT UE may be configured to operate in DRX mode after transiting to the idle state and/or the inactive state. For example, after transiting to the idle state and/or the inactive state, the NB-IoT UE may be configured to monitor an NPDCCH related to paging only in a specific subframe (frame or slot) according to a DRX cycle determined by the BS. Here, the NPDCCH related to paging may refer to an NPDCCH scrambled with a P-RNTI.

Figure 23:
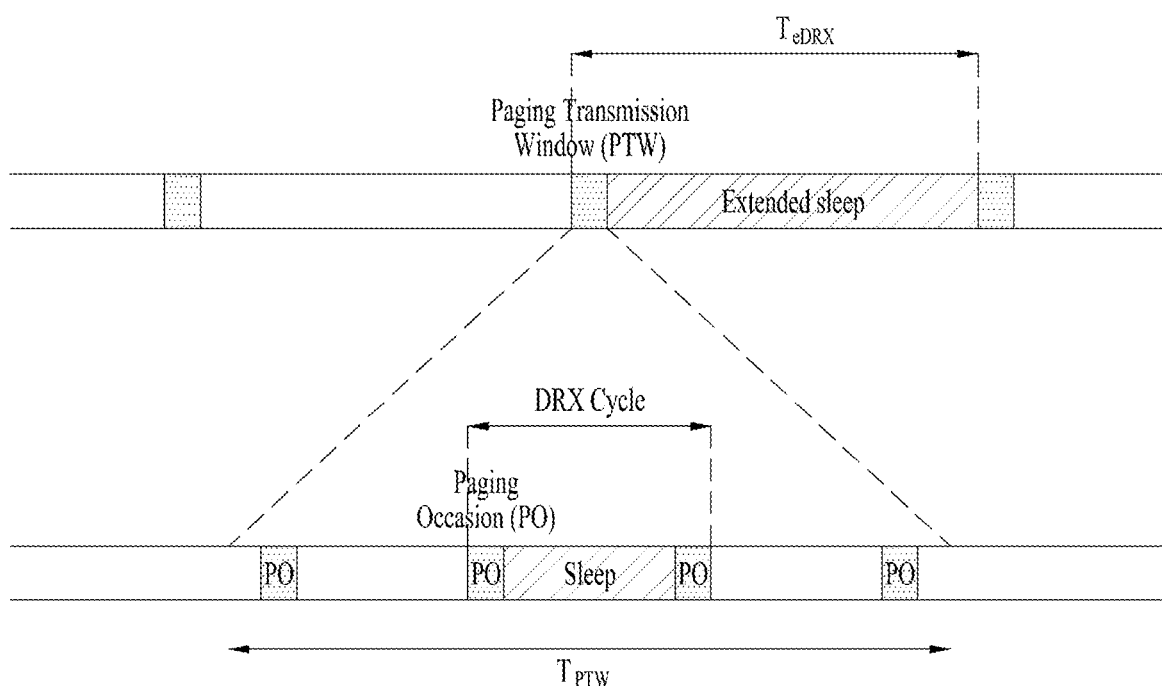
FIG. 23 illustrates an example of DRX mode in an idle state and/or an inactive state.

FIG. 23 illustrates an example of DRX mode in an idle state and/or an inactive state.

Figure 24:
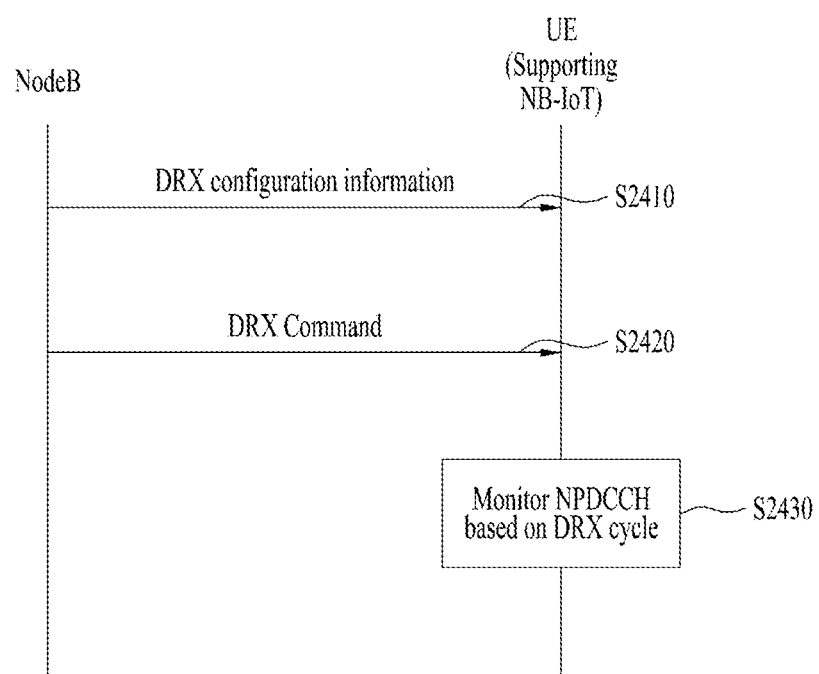
FIG. 24 illustrates an example of a DRX configuration and indication procedure for the NB-IoT UE.

A DRX configuration and indication for the NB-IoT UE may be provided as shown in FIG. 24. That is, FIG. 24 illustrates an example of a DRX configuration and indication procedure for the NB-IoT UE. However, the procedure in FIG. 24 is merely exemplary, and the methods proposed in the present disclosure are not limited thereto.

Referring to FIG. 24, the NB-IoT UE may receive DRX configuration information from the base station (e.g., NodeB, eNodeB, eNB, gNB, etc.) (S2410). In this case, the UE may receive the information from the base station through higher layer signaling (e.g., RRC signaling). The DRX configuration information may include DRX cycle information, a DRX offset, configuration information for DRX-related timers, etc.

Thereafter, the NB-IoT UE may receive a DRX command from the base station (S2420). In this case, the UE may receive the DRX command from the base station through higher layer signaling (e.g., MAC-CE signaling).

Upon receiving the DRX command, the NB-IoT UE may monitor an NPDCCH in a specific time unit (e.g., subframe, slot, etc.) based on the DRX cycle (S2430). The NPDCCH monitoring may mean a process of decoding a specific portion of the NPDCCH based on a DCI format to be received in a corresponding search space and scrambling a corresponding CRC with a specific predefined RNTI value in order to check whether the scrambled CRC matches (i.e. corresponds to) a desired value.

When the NB-IoT UE receives its paging ID and/or information indicating that system information is changed over the NPDCCH during the process shown in FIG. 24, the NB-IoT UE may initialize (or reconfigure) the connection (e.g., RRC connection) with the base station (for example, the UE may perform the cell search procedure of FIG. 20). Alternatively, the NB-IoT UE may receive (or obtain) new system information from the base station (for example, the UE may perform the system information acquisition procedure of FIG. 20).

G. Proposals for Configuring Offset Between Signal and Related Channel

The present disclosure proposes methods of, when a specific signal or channel is used to indicate information for another signal or channel, establishing a relationship between the specific signal or channel carrying the information and the another signal or channel to which the information is targeted. In a particular example, the specific signal carrying the information may be a wake-up signal (WUS) indicating whether the another signal or channel to which the information is targeted will be transmitted or not. The another channel to which the information is targeted may be, for example, an NPDCCH (or PDCCH or MPDCCH) for paging. In this particular example, the WUS may be used to provide information indicating whether the paging NPDCCH will be transmitted. In the following description, a specific signal or channel used to indicate information for another signal or channel is referred to as "signal-A", and a signal or channel corresponding to the information carried by signal-A is referred to as "channel-B". While the following description is given mainly in the context of a relationship between the WUS and the paging NPDCCH, for the convenience of description, it is apparent that the description can be applied to other situations in which a specific signal or channel is generally used to indicate information for another signal or channel. The following proposed methods of the present disclosure may be performed independently, or one or more of the methods may be performed in combination.

In the present disclosure, a case in which a transmitting time of signal-A is determined to be a position relative to a transmitting time of signal-B is considered. In general, once the transmitting time of channel-B is determined, the transmitting time of signal-A may be determined to be a position prior to the transmitting time of channel-B. The accurate transmitting time of signal-A may be determined based on an offset from the transmitting time of channel-B.

G.1 Offset Between Signal-A and Channel-B (Method 1) when a Transmission Starting Time of Signal-A is Determined by an Offset from a Transmission Starting Time of Channel-B, a Value of the Offset May be Determined by a Function of a Transmission Duration of Signal-A.

When the transmission starting time of signal-A is determined by an offset from the transmission starting time of channel-B, the offset should be large enough to enable transmission of signal-A. For example, when the transmission duration of signal-A requires L subframes, the offset should be equal to or larger than at least L subframes. Further, the offset should be determined in consideration of the length of a time period during which transmission is impossible, which exists between the transmission starting time and the transmission ending time of signal-A. In DL NB-IoT transmission, for example, the WUS is transmitted only in valid DL NB-IoT subframes unused for transmission of a system information block (SIB) (or system information), and the other subframes may be treated as invalid subframes. In this case, when a maximum duration required to transmit the WUS is L subframes, the transmission starting time of the WUS should be determined such that L or more valid DL NB-IoT subframes can be included.

To overcome the above problem, the present disclosure proposes a method of determining a value of an offset from channel-B, based on which the transmission starting time of signal-A is determined, by a function of the transmission duration of signal-A.

The function of determining the offset may be in the form of a multiplication of the transmission duration of signal-A and a scaling factor. For example, when signal-A is the WUS and channel-B is the paging NPDCCH, it may be assumed that the scaling factor is determined to be alpha, with the maximum duration of the WUS configured as L. An offset $t_{offset-alpha}$ for determining the transmission starting time of signal-A may be determined by Equation 3.

$$t_{offset-alpha} = \lceil L*\text{alpha} \rceil \quad \text{Equation 3}$$

In Equation 3, $\lceil x \rceil$ represents an operation of obtaining the ceiling of x. Herein, alpha may have a real number value larger than 1.

In Equation 3, the scaling factor alpha may be configured through higher-layer signal such as an SIB or RRC signaling by a base station. In this case, it is advantageous in that the base station can adjust the offset between signal-A and channel-B with increased flexibility. Alternatively, the scaling factor alpha of Equation 3 may be a value implicitly determined by another parameter. For example, the parameter may be an available transmission duration of signal-A per time unit. In a particular example, when the transmission starting time of the WUS is to be determined in NB-IoT, the scaling factor alpha used to determine the offset may be determined depending on the number of valid subframes in a bitmap for indicating valid DL subframes.

Alternatively, the function of determining the offset may be in the form of a table for determining a predefined offset value according to a transmission duration of signal-A. The table may indicate (1) the offset value directly or (2) a scaling factor to be multiplied by the transmission duration of signal-A to calculate the offset value. One or more offset values may correspond to the transmission duration of signal-A in the table. In this case, a criteria of selecting an offset value from the table may be (1) using a value indicated through higher-layer signaling such as an SIB or RRC signaling or (2) determining based on another parameter value (e.g., a ratio of valid DL subframes in the bitmap).

Figure 25:
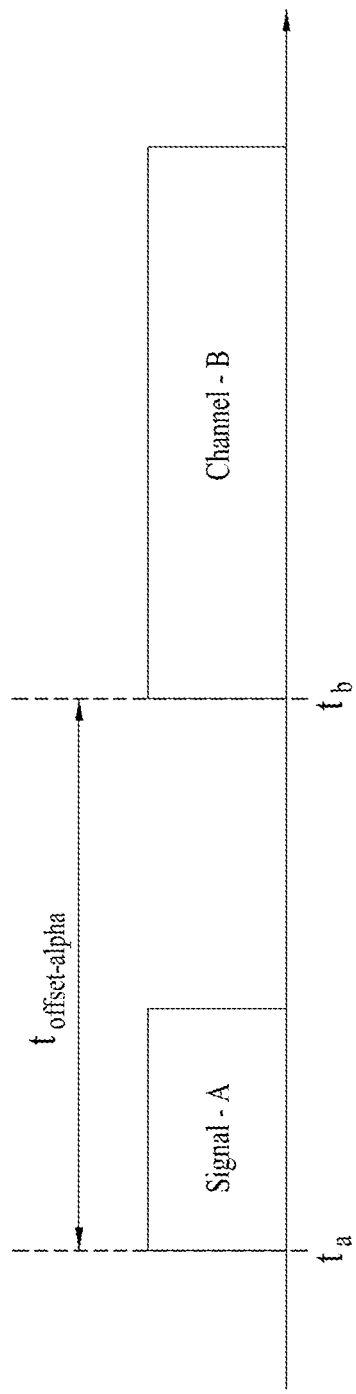
FIG. 25 to FIG. 31 illustrate examples to which the methods according to the present disclosure is applied.

FIG. 25 illustrates an exemplary case in which the offset between the transmission starting time of signal-A and the transmission starting time of channel-B is calculated as $t_{offset-alpha}$ according to the above-described method.

A specific example to which the above method is applied may be given as follows. In this example, it is assumed that there is a bitmap indicating positions of subframes that can be used for DL transmission, the total number of DL subframes representable by the bitmap is X, and the number of subframes available for transmission of signal-A among the X DL subframes is Y. The scaling factor may be determined by a function of X and Y. For example, a table to be used may be determined based on X, and a value may be selected from the table based on Y. This method is advantageous in that values suitable for respective situations may be predetermined, rather than a UE stores the table. In another example, the scaling factor may be defined by the ratio between X and Y. In a more specific example, the scaling factor alpha may be defined as c+d*Y/X where c may be a constant added to set an offset related only to the transmission duration of signal-A irrespective of the ratio between X and Y, and d may be a constant multiplied to correct the relationship between the ratio between X and Y and the offset. Herein, c and d may be selected differently according to the length of X. Alternatively, c and d may be applied differently to an anchor carrier and a non-anchor carrier. This operation may be intended to reflect possible different transmission overheads which are always imposed on the anchor carrier and the non-anchor carrier.

(Method 2) when a Transmission Starting Time of Signal-A is Determined by an Offset from a Transmission Starting Time of Channel-B, a Value of the Offset May be Determined by a Combination of an Additional Offset and a Function of a Transmission Duration of Signal-A.

After the UE obtains information for channel-B from signal-A, the UE may need a certain amount of time or more to prepare for reception of channel-B. For example, when signal-A is a signal detectable without channel estimation, the UE may need a warm-up period to increase the accuracy of channel estimation for the reception of channel-B. In NB-IoT, for example, a UE is allowed to monitor an NRS in 10 valid DL subframe periods before a search space carrying a paging NPDCCH starts in order to monitor the NPDCCH for paging.

When a method of Method 1 is used, the number of signalings or parameters for determining an offset may be limited, which may in turn cause limitation of the granularity of a gap between the transmission ending time of signal-A and the transmission starting time of channel-B. For example, in NB-IoT, the requirement of 10 valid DL subframes for monitoring a paging NPDCCH may not be satisfied. In another example, when the granularity of the transmission duration of signal-A is large, it may be disadvantageous in that the gap increases in proportion to the transmission duration of signal-A. In particular example, for NB-IoT, when the transmission starting time of the WUS is defined by an offset from the transmission starting time of the paging NPDCCH and the offset is determined by a multiplication of the maximum duration of the WUS and the scaling factor alpha, there may be a twofold gap difference between a maximum duration of 1024 subframes for the WUS and a maximum duration of 512 subframes for the WUS, with respect to the same alpha value.

To overcome the above problem, the present disclosure proposes a method of determining an offset from channel-B by an additional offset value and a function of the transmission duration of signal-A, where the transmission starting time of signal-A is determined based on the offset from channel-B. An offset $t_{offset-sum}$ for determining the transmission starting time of signal-A may be determined by Equation 4 below.

$$t_{offset-sum} = t_{offset-alpha} + t_{offset-beta} \quad \text{Equation 4}$$

In Equation 4, $t_{offset-alpha}$ may be obtained using a method described in Method 1.

In Equation 4, $t_{offset-beta}$ may be a value predetermined by the standards. This may be intended to ensure an offset value equal to or larger than a certain value all the time without additional signaling or interpretation. Alternatively, $t_{offset-beta}$ in Equation 4 may be indicated by higher-layer signaling such as an SIB or RRC signaling. This may be intended to ensure a minimum required gap or reduce an unnecessary size of gap by allowing an offset suitable for a situation to be configured by the network. Alternatively, $t_{offset-beta}$ in Equation 4 may be determined by another parameter. For example, the parameter may be the transmission duration of signal-A. This may be intended to predetermine required offsets according to transmission durations of signal-A and reduce unnecessary signaling overhead. The methods of determining $t_{offset-beta}$ may be used independently or one or more of the methods may be used in combination.

Figure 26:
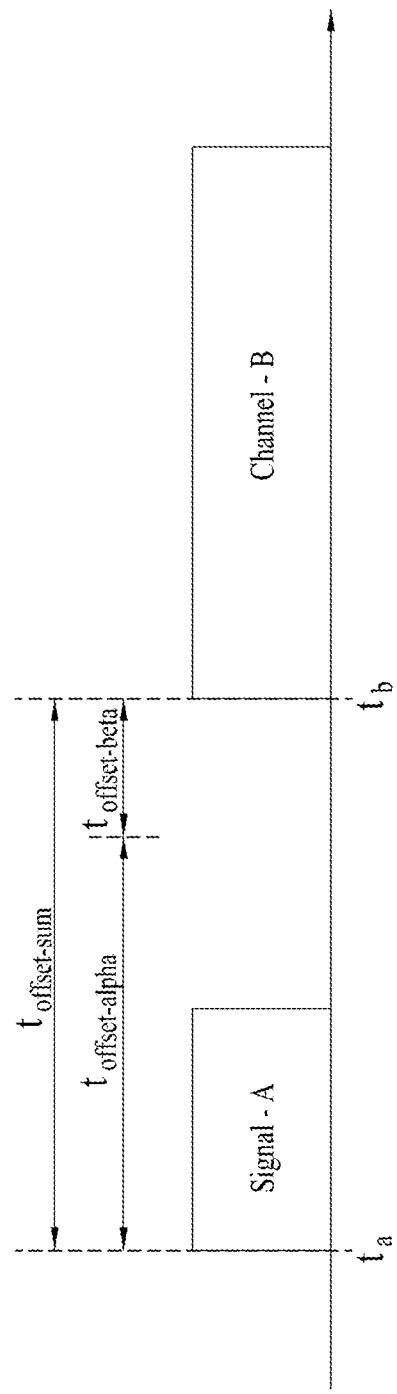

FIG. 26 illustrates an exemplary case in which the offset between the transmission starting time of signal-A and the transmission starting time of channel-B is calculated by a combination of $t_{offset-alpha}$ and $t_{offset-beta}$ in the above-described methods.

(Method 3) in the Case where a Transmission Starting Time of Signal-A is Determined by an Offset from a Transmission Starting Time of Channel-B, when a Transmission Resource at the Starting Time Indicated by the Offset is Unavailable for Transmission of Signal-A, the Transmission Starting Time of Signal-A is Postponed to the Position of the Closest Transmission Resource Available for Transmission of Signal-A Among the Subsequent Transmission Resources.

In operating time-domain/frequency-domain transmission resources by a network, when two or more signals or channels used for different purposes need the same transmission resource, the network may allow the transmission resource only for a specific signal or channel, while prohibiting the use of the transmission resource for the other signals or channels. For example, when a specific signal requires periodic transmission and has importance over the other signals or channels (e.g., a synchronization signal; a PSS/SSS/PBCH or NPSS/NSSS/NPBCH), the network may not allow transmission of the signals or channels for other purposes in the transmission resource carrying the corresponding signal. In another example, in NB-IoT, the network may divide specific subframes of a specific carrier into valid NB-IoT subframes available for NB-IoT transmission and invalid NB-IoT subframes unavailable for NB-IoT transmission, and indicate the valid and invalid NB-IoT subframes to a UE.

To overcome the above problem, the present disclosure proposes a method of, when the transmission starting time of signal-A determined by an offset is unavailable for transmission of signal-A, postponing the transmission starting time of signal-A to the position of the closest transmission resource available for transmission of signal-A among the subsequent transmission resources. In NB-IoT, for example, the WUS may be transmittable only in an NB-IoT DL valid subframe. When the starting transmission subframe of the WUS indicated by an offset is not an NB-IoT DL valid subframe, the WUS transmission may start in the closest NB-IoT DL valid subframe among the subsequent subframes. The proposed method is advantageous in that complexity is reduced because the UE and the base station can determine the transmitting time of signal-A at a time determined based on an offset without preliminarily calculating a reference for determining the transmitting time of signal-A.

Figure 27:
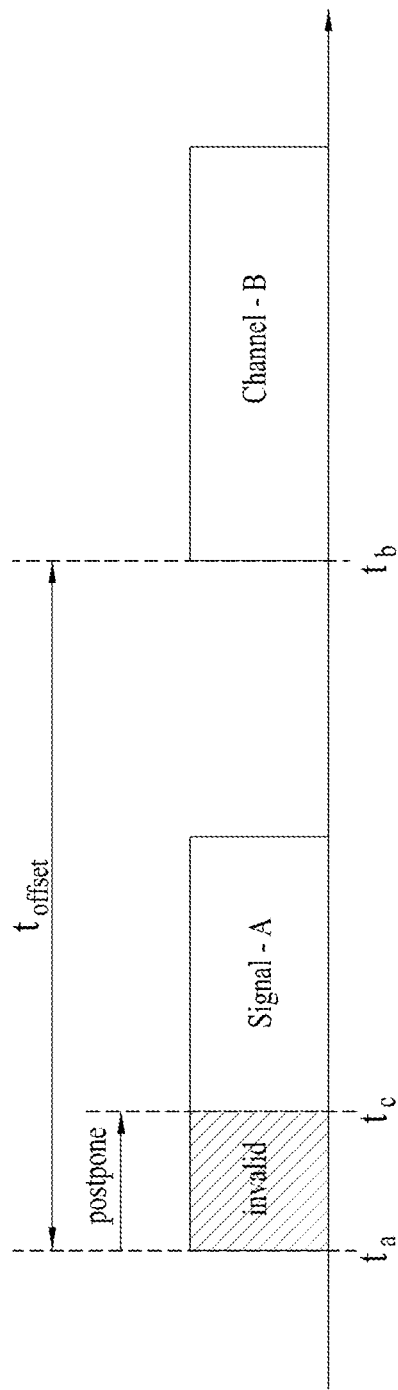

FIG. 27 illustrates an exemplary method of postponing the transmission starting time of signal-A, when the transmission starting time of signal-A is determined by an offset from the transmission starting time of channel-B in the above-described method and a corresponding transmission resource is unavailable (invalid).

(Method 4) in the Case where a Transmission Starting Time of Signal-A is Determined by an Offset from a Transmission Starting Time of Channel-B, when a Transmission Resource at the Starting Time Indicated by the Offset is Unavailable for Transmission of Signal-A, the Transmission Starting Time of Signal-A is Advanced to the Position of the Closest Transmission Resource Available for Transmission of Signal-A Among the Preceding Transmission Resources.

In operating time-domain/frequency-domain transmission resources by a network, when two or more signals or channels used for different purposes need the same transmission resource, the network may allow the transmission resource only for a specific signal or channel, while prohibiting the use of the transmission resource for the other signals or channels. For example, when a specific signal requires periodic transmission and has importance over the other signals or channels (e.g., a synchronization signal; a PSS/SSS/PBCH or NPSS/NSSS/NPBCH), the network may not allow transmission of the signals or channels for other purposes in the transmission resource carrying the corresponding signal. In another example, in NB-IoT, the network may divide specific subframes of a specific carrier into valid NB-IoT subframes available for NB-IoT transmission and invalid NB-IoT subframes unavailable for NB-IoT transmission, and indicate the valid and invalid NB-IoT subframes to a UE.

When the transmission starting time of signal-A is postponed to a later time point as in Method 3, the gap between the transmission ending time of signal-A and the transmission starting time of channel-B may be reduced, and in an extreme case, the transmission areas of signal-A and channel-B may overlap with each other.

To overcome the above problem, the present disclosure proposes a method of, when the transmission starting time of signal-A determined by an offset is unavailable for transmission of signal-A, advancing the transmission starting time of signal-A to the position of the closest transmission resource available for transmission of signal-A among the preceding transmission resources. In NB-IoT, for example, the WUS may be transmittable only in an NB-IoT DL valid subframe. When the starting transmission subframe of the WUS determined by an offset is not an NB-IoT DL valid subframe, the WUS transmission may start in the closest NB-IoT DL valid subframe among the preceding subframes. This method is advantageous in that the gap between the transmission ending time of signal-A and the transmission starting time of channel-B is not reduced.

Figure 28:
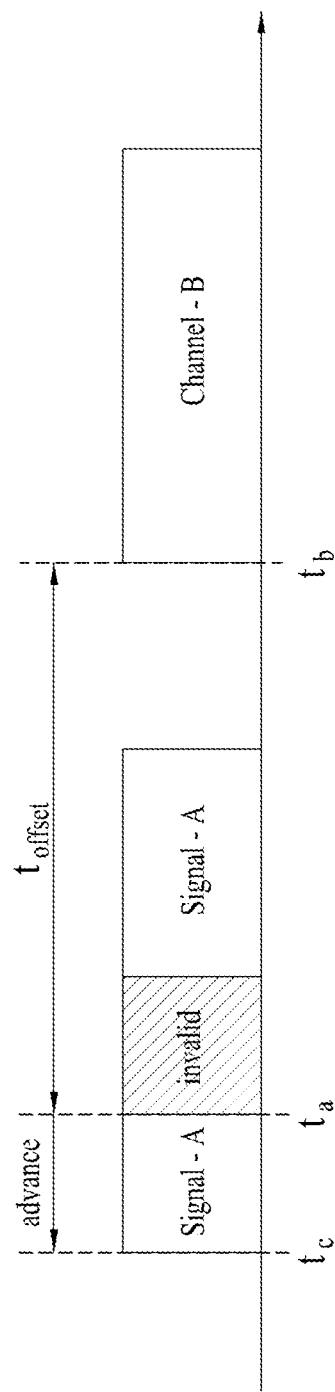

FIG. 28 illustrates an exemplary method of advancing the transmission starting time of signal-A, when the transmission starting time of signal-A is determined by an offset from the transmission starting time of channel-B in the above-described method and a corresponding transmission resource is unavailable (invalid).

(Method 5) in the Case where a Transmission Starting Time of Signal-A is Determined by an Offset from a Transmission Starting Time of Channel-B, a Minimum Gap May be Ensured Between a Transmission Ending Time of Signal-A and the Transmission Starting Time of Channel-B.

After obtaining signal-A, the UE may need a warm-up period to prepare for monitoring channel-B. In a particular example, in NB-IoT, the UE may need a minimum gap for operating a main receiver and monitoring an NRS before a search space carrying a paging NPDCCH starts, in order to monitor the paging NPDCCH.

When the transmission starting time of signal-A is defined by an offset from the transmission starting time of channel-B, the minimum required gap may not be ensured. For example, it may occur that the number of transmission resources available for transmission of signal-A is smaller than a required transmission duration of signal-A, in a time period between the transmission starting time of signal-A and a time when a required gap should start before the transmission starting time of channel-B. In a particular example, in NB-IoT, the number of NB-IoT DL valid subframes between the position of the starting subframe of the WUS determined by an offset from the paging NPDCCH and a subframe in which the gap should start may be smaller than the maximum duration of the WUS.

To overcome the above problem, the present disclosure proposes a method of ensuring a minimum gap between the transmission ending time of signal-A and the transmission starting time of channel-B. Specifically, transmission of signal-A is allowed only before the starting time of a gap and then transmission of signal-A is punctured after the staring time of the gap.

When a method of Method 5 and a method of Method 2 are used together, an offset such as $t_{offset-beta}$ defined in Method 2 may be used to determine a minimum required gap after the transmission starting time of channel-B.

Figure 29:
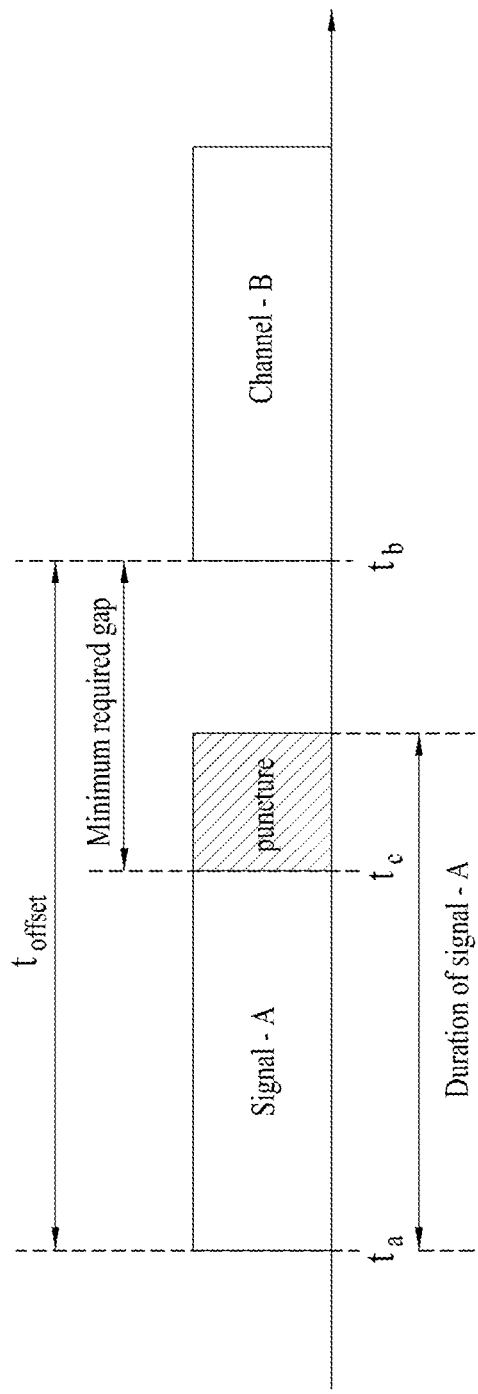

FIG. 29 illustrates an exemplary method of ensuring a minimum gap between the transmission ending time of signal-A and the transmission starting time of channel-B in the above-described method.

(Method 6) when a Transmission Ending Time of Signal-A is Determined by an Offset from a Transmission Starting Time of Channel-B, the Offset May be Calculated Only Based on Transmission Resources Available for Transmission of Signal-A.

A method of determining the transmission ending time of signal-A by an offset from the transmission starting time of channel-B may be used as a method of determining a transmission position of signal-A. In this case, the transmission starting time of signal-A may be calculated to be a position prior to the transmission ending time of signal-A by the transmission duration of signal-A. Herein, the transmission starting time of signal-A may be determined by calculating the transmission duration of signal-A only based on transmission resources available for transmission of signal-A.

After obtaining signal-A, the UE may need a warm-up period to prepare for monitoring channel-B. In a particular example, in NB-IoT, the UE may need a minimum gap for operating a main receiver and monitoring an NRS before a search space carrying a paging NPDCCH starts, in order to monitor the paging NPDCCH.

To overcome the above problem, the present disclosure proposes a method of calculating an offset from the transmission starting time of channel-B based on transmission resources available for transmission of signal-A, when determining the transmission ending time of signal-A.

G.2 Offset and UE Capability

The transmitting time of signal-A may be determined by a relative offset from the transmitting time of channel-B. The offset may be defined as an interval between a transmission starting time of signal-A and a transmission starting time of channel-B, or may be defined as an interval between a transmission ending time of signal-A and the transmission starting time of channel-B.

Depending on how a UE is implemented, the UE may require a different processing time to detect (or decode) signal-A. Alternatively, depending on how the UE is implemented, the UE may require a different preparation time to start monitoring channel-B after completely detecting (or decoding) signal-A. Therefore, depending on how the UE is implemented, the size of a gap which is the interval between the transmission ending time of signal-A and the transmission starting time of channel-B may vary, or an offset that determines the transmitting time of signal-A may vary. Performance difference of the UE caused by implementation difference of the UE may be defined as a UE capability and identified accordingly. The UE may have a different required gap size or offset size according to its UE capability.

(Method 7) there May be One or More Offset Determination Methods which a Base Station May Configure. The Base Station May Indicate One Offset Determination Method to a UE by Higher-Layer Signaling Such as an SIB or RRC Signaling.

A size of required minimum gap between signal-A and channel-B and an offset value which may determine the required minimum gap may vary under circumstances, like the above-described problem. For example, when the WUS serves as signal-A and the paging NPDCCH serves as channel-B in NB-IoT, a required gap between the WUS and the paging NPDCCH may range from tens of milliseconds to a few seconds depending on UE implementation. When the base station indicates an offset by higher-layer signaling such as an SIB or RRC signaling, interpretation of every gap in the same field may significantly increase overhead. Moreover, an optimized method of determining an offset to support a gap in units of tens of milliseconds may be different from an optimized method of determining an offset to support a gap in units of a few seconds.

To overcome the above problem, the present disclosure proposes a method of indicating an offset determination method by higher-layer signaling such as an SIB or RRC signaling. For example, when there are two methods of determining an offset between the transmission starting time of signal-A and the transmission starting time of channel-B: option 1 for supporting a small offset and option 2 for supporting a large offset, the base station may determine and configure an offset in one of option 1 and option 2 and indicate the determined option to the UE.

In a specific method to which a method of Method 7 is applied, the base station may include 1-bit indication information indicating a selected offset determination method in higher-layer signaling such as an SIB or RRC signaling. For example, when the 1-bit indication information is 0, the UE may calculate an offset according to option 1, whereas when the 1-bit indication information is 1, the UE may calculate an offset according to option 2. When an additional field for determining a specific offset value is configured in N bits, this field may be interpreted differently according to the 1-bit indication information.

In another specific method to which the method of Method 7 is applied, the base station may include an N-bit field for determining an offset between signal-A and channel-B in higher-layer signaling such as an SIB or RRC signaling, and configure 2N states representable by the N-bit field to be used separately for different offset determination methods. For example, one of the 2N states may be used as an information representation scheme for selecting the method of determining an offset of a length of a few seconds, and the other (2N−1) states are used as an information representation scheme for selecting the method of determining an offset of a length of a few milliseconds. This is because an offset of a length of a few seconds may be less sensitive to a gap size than an offset of a length of a few milliseconds and thus require a relatively low-level granularity.

In another specific method to which the method of Method 7 is applied, the base station may indicate only information for an offset determination method used by default, and when the indicated information satisfies a specific condition, apply another offset determination method. For example, the specific condition may be that a signaled offset does not satisfy a minimum required gap between the transmission ending time of signal-A and the transmission starting time of channel-B. Advantageously, the base station may change an offset determination method without additional signaling.

(Method 8) there May be One or More Transmission Positions of Signal-A Corresponding to One Channel-B. A UE May Determine a Transmission Position to Monitor Signal-A According to its UE Capability.

As noted from the above-described problem, a minimum required gap between signal-A and channel-B and an offset that can determine the minimum required gap may vary depending on how a UE is implemented. When an offset for supporting a small gap size is configured, a UE requiring a large gap size may not easily monitor signal-A. On the contrary, when an offset for supporting a large gap size is configured, a UE to which a small gap size is enough may experience performance degradation due to power consumption or the like caused by an unnecessary extra gap size.

To overcome the above problem, the present disclosure proposes a method of configuring one or more transmission positions of signal-A in correspondence with one channel-B. Different signal-A transmissions may be distinguished from each other by different offsets, and the UE may select a suitable offset based on its UE capability and monitor signal-A according to the selected offset. The UE capability may be determined based on a minimum required gap size (or offset size) required for the UE. When the UE reports its UE capability to the base station, the base station may predict a position at which each UE will monitor signal-A and thus may transmit signal-A only at a corresponding transmission position.

Figure 30:
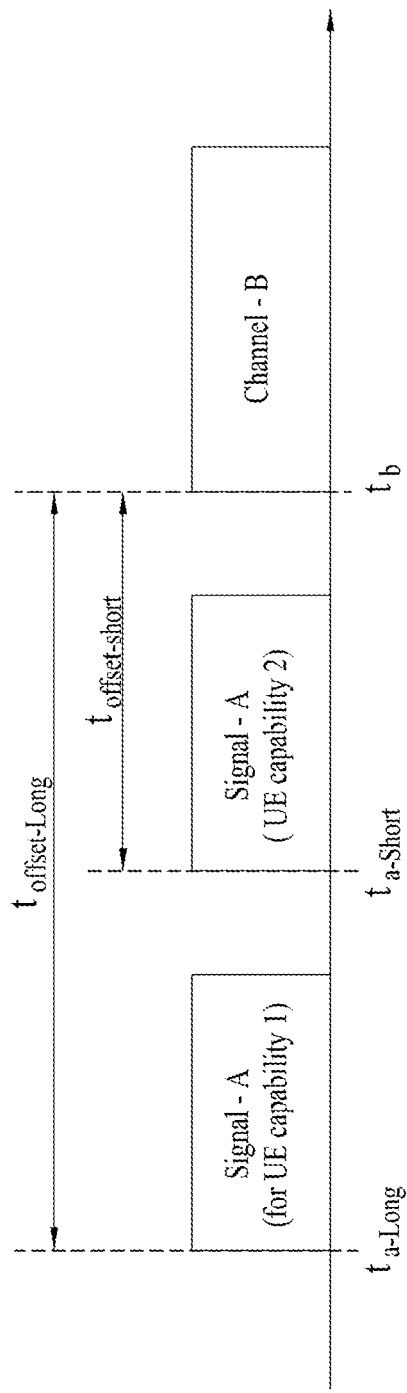

FIG. 30 illustrates an exemplary method of determining an offset between the transmission starting time of signal-A and the transmission starting time of channel-B according to a UE capability using the above-described method.

When a transmitting time of signal-A is determined based on two offsets from one channel-B, the relatively longer offset is referred to as offset-long and the relatively shorter offset is referred to as offset-short in the following description of the present disclosure, for the convenience of description. To enable a UE to identify the positions of the transmission starting time and the transmission ending time of signal-A which are suitable for its UE capability, the base station should signal information for different offsets to the UE. When two different offsets exist for signal-A and are indicated as offset-long and offset-short by higher-layer signaling such as an SIB or RRC signaling, one of the following sub-methods may be used as a specific method of indicating the offsets.

(Sub-Method 8-1)

Each of offset-long and offset-short may be indicated in independent fields of an SIB or RRC signaling. The UE may recognize both information for offset-long and information for offset-short, and interpret and use a field suitable for its UE capability. This method is advantageous in that scheduling flexibility is ensured as much as possible for each of offset-long and offset-short without any mutual influence.

(Sub-Method 8-2)

At least one of offset-long and offset-short may be a value fixed by the standards. For example, a fixed value defined by the standards may be used as offset-long, and offset-short may be a value indicated by higher-layer signaling such as an SIB or RRC signaling. This is because the interval between signal-A and channel-B for offset-long is relatively long and thus there is no or little effect of scheduling restriction, whereas the interval between signal-A and channel-B for offset-short is significantly affected by the number of available transmission resources or a communication environment.

(Sub-Method 8-3)

Offset-long and offset-short may be indicated in the same field of an SIB or RRC signaling. In an exemplary specific method, the size of offset-short may be indicated by higher-layer signaling, and the size of offset-long may be determined by an offset and/or multiple of the size of offset-short. In another exemplary specific method, a field for indicating an offset in higher-layer signaling may be interpreted differently according to a UE capability. This may be intended to, when there is a correlation between a required offset-long size and a required offset-short size, control both of the offsets, while reducing overhead based on this property.

(Method 9) There May be One or More Transmission Positions of Channel-B Corresponding to One Transmission Position of Channel-A. A Transmission Position of Channel-B to be Monitored by a UE that has Obtained Channel-A May be Determined According to the UE Capability of the UE.

When as many transmission positions of signal-A for each channel-B transmission as the number of UE capabilities are required to support the multiple UE capabilities, the network may suffer from increased overhead for transmission of signal-A and scheduling restriction.

To overcome the above problem, the present disclosure proposes a method of designating one or more instances of a transmitting time position of channel-B corresponding to a transmitting time of signal-A and determining a transmitting time of channel-B corresponding to transmission of signal-A according to a UE capability. Like a method of Method 8, this method may restrict a transmitting time of signal-A to a transmitting time of signal-A at other position corresponding to a transmitting time of other channel-B, in the situation that there exist multiple instances of a transmitting time of signal-A corresponding to one transmitting time of channel-B. For example, when a transmission point of the WUS corresponding to each paging NPDCCH is predetermined in NB-IoT, a UE which requires offset-short being a short offset is configured to monitor the transmission position of the WUS corresponding to an $n^{th}$ paging NPDCCH to determine whether to monitor the $n^{th}$ paging NPDCCH, and a UE which requires offset-long being a long offset is configured to monitor the transmission position of the WUS corresponding to an $(n-1)^{th}$ paging NPDCCH to determine whether to monitor the $n^{th}$ paging NPDCCH.

Figure 31:
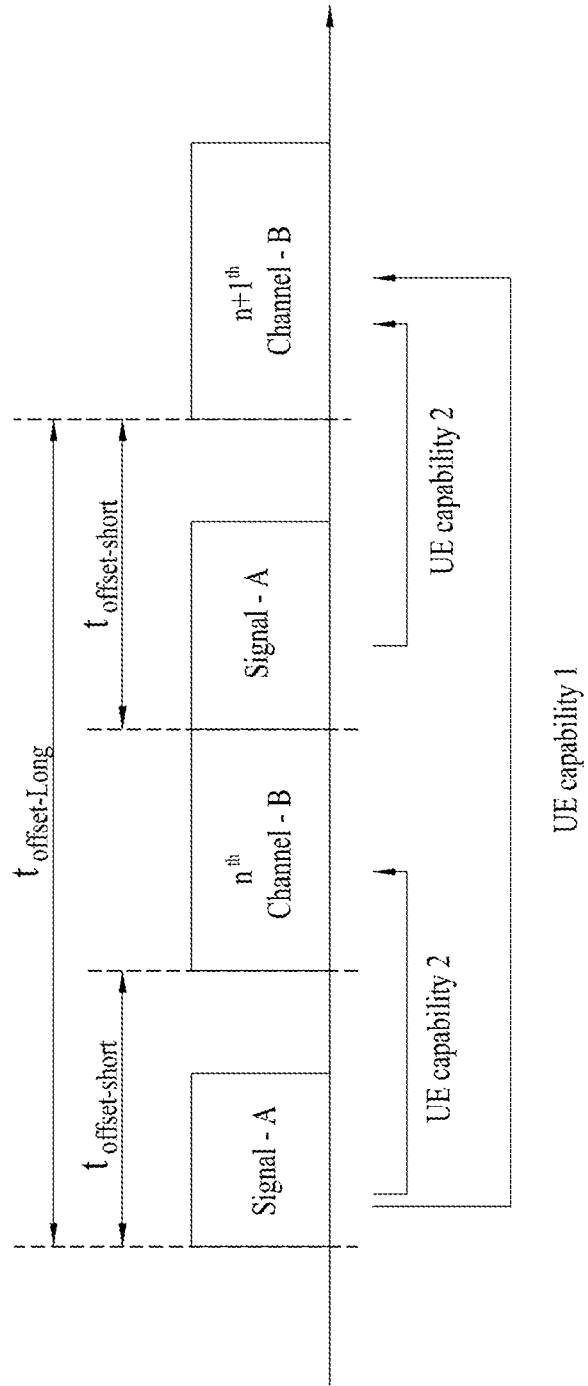

FIG. 31 illustrates an exemplary method of determining an offset between the transmission starting time of signal-A and the transmission starting time of channel-B according to a UE capability according to the above-proposed method.

In an exemplary specific method to which the proposed Method 9 is applied, positions at which channel-B may be transmitted in a DRX cycle may be configured periodically. In a specific example, a search space available for transmission of the paging NPDCCH may be configured according to a DRX cycle, and a transmitting time of the WUS may be determined to be prior to the transmission starting time of each paging NPDCCH by a specific offset. Upon receipt of the WUS, a UE requiring offset-short may expect and monitor the subsequent paging NPDCCH. Upon receipt of the WUS, a UE requiring offset-long may monitor a paging NPDCCH in the next DRX cycle (or after X DRX cycles) without monitoring the subsequent paging NPDCCH. This example may be expressed as Equation 5.

$$t_{offset-long} = X*T + t_{offset-short}$$ Equation 5

In Equation 5, $t_{offset-long}$ represents an offset for a UE with a UE capability requiring offset-long, and $t_{offset-short}$ represents an offset for a UE with a UE capability requiring offset-short. T represents the size of a DRX cycle for the paging NPDCCH. When X is an integer (e.g., X=1, 2, . . . ) in the above equation, a UE requiring offset-long shares a WUS transmitting time of a UE with an offset-short UE capability sharing the same paging occasion (PO), and the PO corresponding to the WUS is interpreted differently. When X is a rational number (e.g., X=½, ¼, . . . ) in Equation 5, a UE requiring offset-long shares a WUS transmitting time corresponding to a PO for another UE group (which is identified by UE_ID and determines whether to monitor a specific PO).

When a method of Method 9 is applied, T may be limited to a predetermined value to prevent a UE applying offset-long from waiting too long. For example, a search space available for transmission of the paging NPDCCH is configured according to a DRX cycle and a transmitting time of the WUS is determined to be prior to the transmission starting time of each paging NPDCCH by a predetermined offset. When available DRX sizes are {1.28s, 2.56s, 5.12s, 10.245} and 10.24s is selected, the interval between the WUS and the paging may increase excessively. To overcome this problem, T may be determined to be as small as possible to determine offset-long between the WUS and the paging.

The equation of determining $t_{offset-long}$ may also be used when a transmission of signal-A is not applied. For example, regarding the transmission position of signal-A determined by Equation 5, one or more channel-B transmissions may correspond to one signal-A transmission position according to the value of T and/or X.

(Method 10) Signal-A May Include Information for a Transmission Position of Corresponding Channel-B.

When UEs having different UE capabilities share one transmission position of signal-A as in the method of Method 9, some UEs may detect information for unintended (or wrong) channel-B. For example, when signal-A is the WUS and channel-B is the paging NPDCCH, the WUS transmitted to wake up a UE having the offset-long UE capability may also wake up a UE having the offset-short UE capability, which shares the same WUS transmitting time, thereby causing unnecessary power consumption.

To overcome the above problem, the present disclosure proposes a method of including information for a transmission position of corresponding channel-B in signal-A by a base station. For example, this information may indicate a UE capability that determines an offset size. When detecting information corresponding to its UE capability in signal-A, a UE may monitor corresponding channel-B according to a determined offset.

When signal-A is configured as a sequence in the method of Method 10, information included in signal-A may be identified by a sequence and/or a cover code or scrambling. For example, a Zadoff Chu (ZC) sequence is used as a base sequence for signal-A, a root index, a cyclic shift value, or the like of the ZC sequence may be used, or a cover code or a scrambling code may be applied.

When the method of Method 10 is used, one or more of informations represented by signal-A may be used to indicate two or more UE capabilities at the same time. This may be intended to simultaneously provide information to a plurality of UEs having different UE capabilities at one transmitting time of signal-A shared by the plurality of UEs. For example, when two UE capabilities exist, three or more sequences may be transmitted in one signal-A, two of the sequences for distinguishing UEs with the respective UE capabilities and the other sequence for one common indication to UEs with all UE capabilities.

When signal-A including information applied commonly to all UE capabilities is transmitted as in the above-proposed method, a UE having the respective UE capability may apply an offset corresponding to its UE capability and receive channel-B accordingly. This may be intended to guide transmission and reception of channel-B suitable for a UE capability and thus allow the UE to obtain information directed to the UE or perform an optimized operation.

Alternatively, when signal-A including information applied commonly to all UE capabilities is transmitted as in the above-proposed method, UEs with all UE capabilities may receive channel-B by applying a maximum offset. This may be intended to prevent the increase of overhead caused by unnecessary repeated transmissions of channel-B on the part of the network, when channel-B includes common information irrespective of all UE capabilities.

(Method 11) the Number of Transmission Positions of Channel-B Corresponding to Signal-A May be Determined According to an Offset Between Signal-A and Channel-B.

When the offset between signal-A and channel-B is longer than an occurrence periodicity of channel-B, one or more signal-A occurrence time positions may additionally exist during the offset period between signal A and corresponding channel-B. When information for channel-B that is carried by signal-A is valid for a predetermined time period, repeated transmissions and monitoring of signal-A may be inefficient in terms of network overhead or UE power saving. For example, when signal-A is the WUS and channel-B is the paging NPDCCH, the base station may transmit the paging NPDCCH repeatedly in a plurality of POs to enable a UE to receive paging reliably. In this situation, for example, the UE may simply monitor signal-A continuously before transmission of corresponding channel-B starts, after the UE obtains signal-A once. However, the repeated monitoring of the WUS before successful decoding of the paging NPDCCH may lead to continuous decoding of information for the same purpose and hence unnecessary power consumption.

To overcome the above problem, the present disclosure proposes a method of determining the number of transmission positions of channel-B corresponding to signal-A according to an offset between signal-A and channel-B. Specifically, the number of transmission positions of channel-B corresponding to signal-A may be determined such that the offset between signal-A and channel-B is determined based on a specific threshold. For example, the specific threshold may be the periodicity of channel-B (or a value proportional to the periodicity of channel-B). For example, when signal-A is the WUS and channel-B is the paging NPDCCH, the offset threshold may be the periodicity of a PO (e.g., a DRX cycle).

In a specific example of the proposed method, there are two offsets between signal-A and channel-B: offset-long, that is, an offset larger than the transmission periodicity of channel-B and offset-short, that is, an offset shorter than the transmission periodicity of channel-B. The UE may be configured to identify a mapping relationship between signal-A and channel-B according to an offset applied to the UE. For example, one transmission position of channel-B may be set in correspondence with signal-A, for a UE with offset-short, and two or more transmission positions of channel-B may be set in correspondence with signal-A, for a UE with offset-long.

When a one-to-multi correspondence is built between signal-A and channel-B in the above proposed method, the number of corresponding channel-B transmission positions may be (1) predetermined in the standards, (2) configured by a base station, or (3) determined by another parameter. When the number of corresponding channel-B transmission positions is predetermined in the standards, the UE may advantageously perform a predetermined operation all the time without additional signaling. Despite the advantage, an inefficient correspondence may be generated under circumstances, for example, in view of an offset size. When the number of corresponding channel-B transmission positions is configured by a base station, the number may be determined by higher-layer signaling such as an SIB or RRC signaling. In spite of the advantage of a possible efficient configuration according to an offset size or an operation scheme of a UE, this method may cause additional signaling overhead. When the number of corresponding channel-B transmission positions is determined by another parameter, the parameter may be, for example, an offset size and/or the transmission periodicity of channel-B. In an exemplary specific method, the parameter may be the number of all transmission positions of signal-A between signal-A and corresponding channel-B. In another example of determining the number of corresponding channel-B transmission positions by another parameter, the parameter may be an eDRX configuration. In an exemplary specific method, a different correspondence may be established between signal-A and channel-B, depending on whether eDRX is configured.

G.3 Flowcharts According to the Present Disclosure

Figure 32:
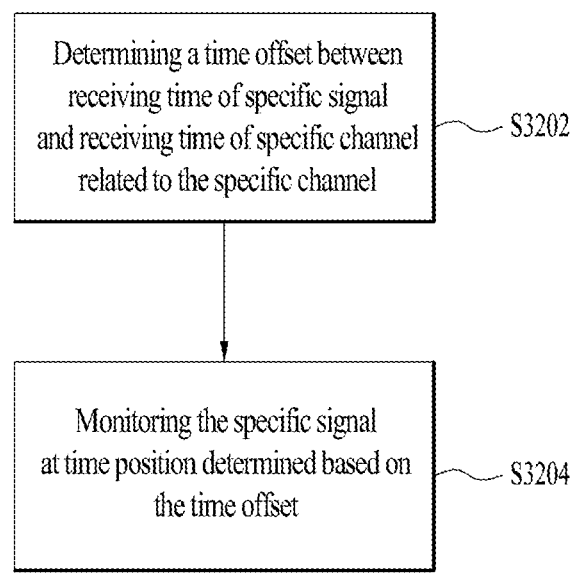
FIG. 32 and FIG. 33 illustrate exemplary flowcharts of the methods according to the present disclosure.

FIG. 32 is an exemplary flowchart illustrating a method of the present disclosure. While the example of FIG. 32 is described in the context of a terminal (e.g., UE) operation, an operation corresponding to the operation illustrated in FIG. 32 may be performed by a base station.

Referring to FIG. 32, a UE may determine a time offset between a receiving (or transmitting) time of a specific signal (e.g., signal-A) and a receiving (or transmitting) time of a specific channel (e.g., channel-B) related to the specific signal (S3202). For example, the UE may determine the time offset between the receiving (or transmitting) time of the specific signal (e.g., signal-A) and the receiving (or transmitting) time of the specific channel (e.g., channel-B) related to the specific signal based on one or a combination of two or more of the methods (e.g., Method 1 to Method 6) described in Section G.1. The receiving (or transmitting) time of the specific signal may refer to the reception (or transmission) starting time of the specific signal or the reception (or transmission) ending time of the specific signal.

More specifically, for example, a time offset $t_{offset-alpha}$ may be determined based on Method 1 of the present disclosure in S3202. In another example, a time offset $t_{offset-sum}$ may be determined based on Method 2 of the present disclosure in S3202. The time offset $t_{offset-sum}$ may be determined based on a first time offset (e.g., $t_{offset-alpha}$) and a second time offset (e.g., $t_{offset-beta}$).

Independently of or additionally to the afore-described examples, when the receiving (or transmitting) time of the specific signal is an unavailable time resource in S3202, the time offset may be postponed to a closest available time resource (or the time offset may be determined by excluding time resources until the closest available time resource) (e.g., refer to Method 3 of the present disclosure). Alternatively, when the receiving (or transmitting) time of the specific signal is an unavailable time resource in S3202, the time offset may be advanced to a closest available time resource (or the time offset may be determined by including time resources until the closest available time resource). For example, the unavailable time resource may include a subframe which has not been configured as a valid subframe (or an invalid subframe). In a more specific example, the unavailable time resource may include a subframe except for a subframe configured as an NB-IoT DL subframe (or a subframe which has not been configured as an NB-IoT DL subframe) (by the base station).

Independently of or additionally to the afore-described examples, a minimum gap may be ensured between the reception (or transmission) ending time of the specific signal (e.g., signal-A) and the reception (or transmission) starting time of the specific channel (e.g., channel-B) (e.g., refer to Method 5 of the present disclosure).

Independently of or additionally to the afore-described examples, the time offset may be determined only based on transmission resources available for transmission of the specific signal (e.g., signal-A) (refer to Method 6 of the present disclosure).

The UE may determine a time position at which the specific signal (e.g., signal-A) is transmitted based on the time offset determined in S3202, and monitor the specific signal (e.g., signal-A) at the determined time position. Monitoring may refer to an operation of detecting and/or decoding a signal.

For example, the time position at which the specific signal (e.g., signal-A) is received (or transmitted) may be determined based on the time offset and the receiving (or transmitting) time of the specific channel (e.g., channel-B). In a more specific example, the received (or transmitted) time position of the specific signal (e.g., signal-A) may be determined by applying (e.g., adding) the time offset to the receiving (or transmitting) time of the specific channel (e.g., channel-B).

In S3204, upon detection of the specific signal (e.g., signal-A) at the determined time position, the UE may monitor the specific channel (e.g., channel-B) based on the time offset determined in S3202. On the contrary, when the UE fails to detect the specific signal at the determined time position in S3204, the UE may skip monitoring the specific channel (e.g., channel-B) (or the UE may not monitor the specific channel (e.g., channel-B).

Figure 33:
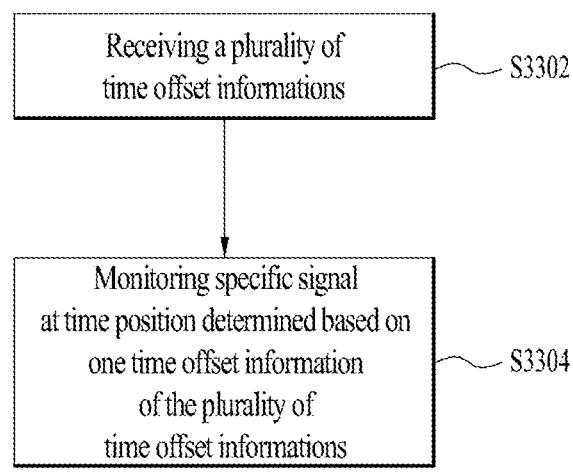

FIG. 33 is an exemplary flowchart illustrating a method of the present disclosure. While the example of FIG. 33 is described in the context of a terminal (e.g., UE) operation, an operation corresponding to the operation illustrated in FIG. 33 may be performed by a base station.

Referring to FIG. 33, the UE may receive a plurality of time offset informations in S3302. For example, the UE may receive a plurality of time offset informations including first time offset information (e.g., offset-short) and second time offset information (e.g., offset-long). In a more specific example, the first time offset information may be configured to have a shorter length than the second time offset information. As described before, time offset information may indicate a time offset between the reception (or transmission) (starting or ending) time of a specific signal (e.g., signal-A) and the reception (or transmission) (starting or ending) time of a specific channel (e.g., channel-B) related to the specific signal.

In S3304, the UE may determine a time position for the specific signal (e.g., signal-A) based on one of the plurality of time offset informations, and monitor the specific signal at the determined time position. Monitoring may refer to an operation of detecting and/or decoding a signal.

According to the present disclosure, the one time offset information may be determined based a UE capability of the UE (e.g., refer to Method 8 of the present disclosure), and the UE may report the UE capability to the base station before performing this method. The plurality of time offset informations may be received in system information (or an SIB) or an RRC signal. Further, the plurality of time offset informations may be received in independent fields of system information (or an SIB) or an RRC signal (e.g., refer to Sub-method 8-1). Further, one or more of the plurality of time offset informations may be values fixed in the standards (e.g., refer to Sub-method 8-2). Further, the plurality of time offset informations may be indicated by the same field in higher-layer signaling such as an SIB or RRC signaling (e.g., refer to Sub-method 8-3). Independently or additionally, the time offset information may be determined based on one or more of the methods described in Section G.1 in combination.

The specific signal (e.g., signal-A) may be a physical signal, and the specific channel (e.g., channel-B) may be a physical control channel. For example, the specific signal (e.g., signal-A) may be a WUS, and the specific channel (e.g., channel-B) may be a paging NPDCCH.

Alternatively, instead of the plurality of time offset informations, a plurality of option informations may be configured for the UE, and the base station may signal information indicating one of the plurality of option informations to the UE in S3302 of FIG. 33 (e.g., refer to Method 7 of the present disclosure). In this case, the UE may determine a time offset based on the indicated option information and monitor the specific signal at a time position determined based on the determined time offset in S3304.

Alternatively, the UE may acquire a plurality of time offset informations based on Method 9 of the present disclosure in S3302. In this case, one of the plurality of time offset informations may be determined according to the UE capability based on Method 9 of the present disclosure 9, and the UE may monitor the specific signal at a time position determined based on the determined one time offset information.

Upon detection of the specific signal (e.g., signal-A) at the determined time position in S3304, the UE may monitor the specific channel (e.g., channel-B) based on the one time offset information. On the contrary, when the UE fails to detect the specific signal at the determined time position in S3304, the UE may skip monitoring the specific channel (e.g., channel-B) (or the UE may not monitor the specific channel (e.g., channel-B)).

While the methods of the present disclosure have been described focusing on the relationship between the WUS and the paging NPDCCH, the principle of the present disclosure is not limited to the relationship between the WUS and the paging NPDCCH. Particularly, signal-A refers to a specific signal or channel used to indicate information for another signal or channel, as described in the beginning of Section G. Accordingly, signal-A may be replaced with a channel used to indicate information for another channel in the methods of the present disclosure. For example, signal-A may be a physical channel, and particularly, a physical control channel (e.g., PDCCH, MPDCCH, or NPDCCH).

For example, signal-A may be a physical control channel (e.g., PDCCH, MPDCCH, or NPDCCH), indicating whether channel-B is to be received (transmitted or monitored) in the methods of the present disclosure. In this example, a time offset between signal-A and channel-B may be determined in one or more of the methods of the present disclosure in combination.

Particularly, a time offset between signal-A and channel-B may be indicated by signal-A (e.g., refer to Method 10 of the present disclosure). For example, the time offset between signal-A and channel-B may be indicated by DCI received on a physical control channel corresponding to signal-A. More specifically, for example, the time offset between signal-A and channel-B may be indicated by a specific field of the DCI.

When the UE is configured with a plurality of time offset determination methods (e.g., refer to Method 7 of the present disclosure), with a plurality of time offset informations (e.g., refer to Method 8 of the present disclosure), or with a plurality of reception (or transmission) positions of channel-B corresponding to signal-A (e.g., refer to Method 9 of the present disclosure), the base station may indicate one time offset determination method, one time offset information, or one reception (or transmission) position to the UE by DCI (or a specific field in the DCI) transmitted and received on a physical control channel corresponding to signal-A. Alternatively, the base station may indicate one time offset determination method, one time offset information, or one reception (or transmission) position to the UE based on an ID (e.g., RNTI) used for the physical control channel corresponding to signal-A.

Further, signal-A may be associated with at least one channel-B. Therefore, signal-A may indicate whether one or more channel-Bs are to be received (transmitted or monitored). Upon detection of signal-A, the UE may monitor one or more channel-Bs based on a time offset determined according to the present disclosure.

G.4 Device Structures

Figure 34:
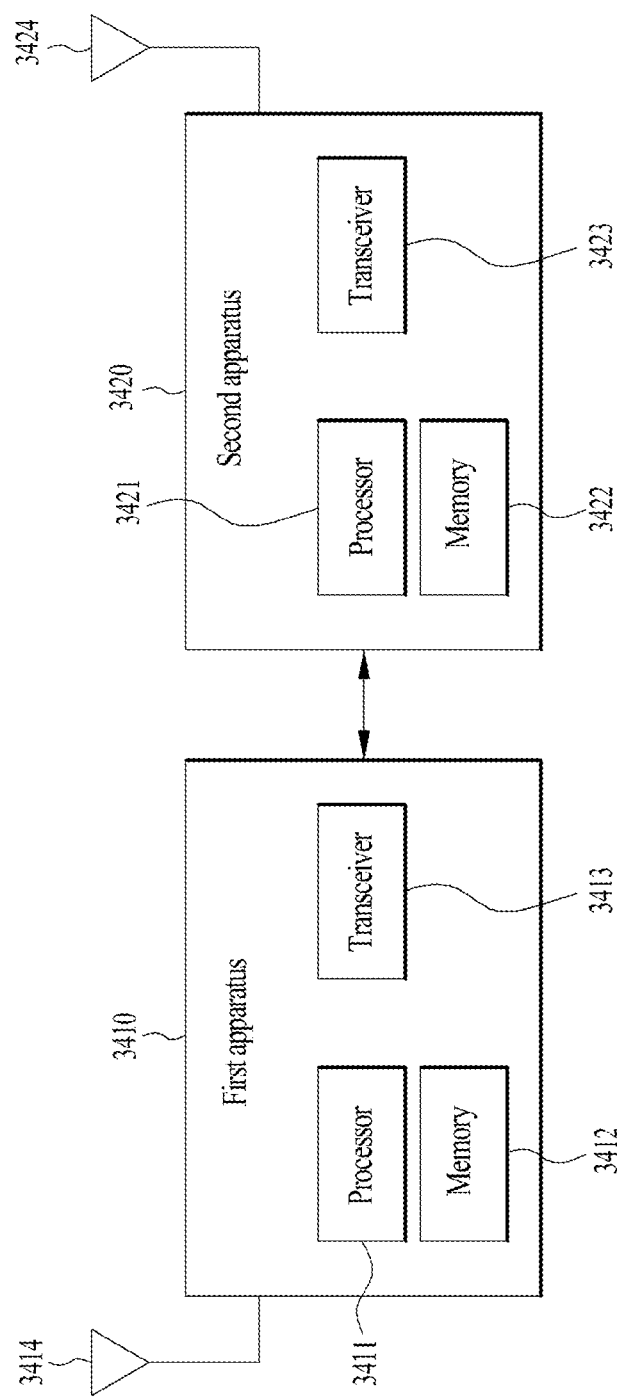
FIG. 34 illustrates an example of block diagrams of wireless communication apparatuses to which the methods proposed in the present disclosure are applicable.

FIG. 34 illustrates exemplary structures of wireless communication devices to which the proposed methods of the present disclosure are applicable.

Referring to FIG. 34, a wireless communication system may include a first device 3410 and a second device 3420.

The first device 3410 may be a BS, a network node, a transmission UE, a reception UE, a wireless device, a wireless communication device, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a weather/environmental device, a device related to 5G service, or a device related to a $4^{th}$ industrial revolution field.

The second device 3420 may be a BS, a network node, a transmission UE, a reception UE, a wireless device, a wireless communication device, a vehicle, a vehicle having an autonomous traveling function, a connected car, a UA), an AI module, a robot, an AR device, a VR device, an MR device, a hologram device, a public safety device, an MTC device, an IoT device, a medical device, a FinTech device (or financial device), a security device, a weather/environmental device, a device related to 5G service, or a device related to a $4^{th}$ industrial revolution field.

A UE may include, for example, a cellular phone, a smartphone, a laptop computer, a digital broadcasting terminal, a personal digital assistant (PDA), a portable multimedia player (PMP), a navigation system, a slate personal computer (PC), an ultrabook, and a wearable device (e.g., a smart watch, smart glasses, or a head-mounted display (HMD)). The HMD may be, for example, a device type worn on the head. For example, the HMD may be used to implement VR, AR, and MR.

The UAV may be, for example, an unmanned aircraft without a human being onboard, which flies by a wireless control signal. The VR device may include, for example, a device that renders objects or a background of a virtual world. The AR device may include, for example, a device which connects an object or background in a virtual world to an object or background in a real world. The MR device may include, for example, a device which merges an object or background in a virtual world with an object or background in a real world. The hologram device may include, for example, a device which renders 360-degree stereoscopic images by recording and reproducing stereoscopic information, relying on light interference occurring when two laser beams meet. The public safety device includes, for example, an image relay device or image device wearable on a user's body. The MTC device and the IoT device may include, for example, a device which does not require human intervention or manipulation. For example, the MTC device and the IoT device may include a smart meter, a vending machine, a thermometer, a smart bulb, a door lock, or various sensors. The medical device may include, for example, a device used for diagnosis, treatment, relief, curing, or prevention of diseases. For example, the medical device may be a device used for the purpose of inspecting, replacing, or modifying a structure or a function. For example, the medical device may be a device used for pregnancy adjustment. For example, the medical device may include a device for treatment, a surgery device, an (in vitro) diagnosis device, a hearing aid, or a device for a procedure. The security device may be, for example, a device installed to avoid danger and maintain safety. For example, the security device may be a camera, a closed-circuit television (CCTV), a recorder, or a black box. The FinTech device may be, for example, a device which may provide a financial service such as mobile payment. For example, the FinTech device may include a payment device or a point of sales (POS) terminal. The weather/environmental device may be, for example, a device which monitors weather/an environment.

The first device 3410 may include at least one processor such as a processor 3411, at least one memory such as a memory 3412, and at least one transceiver such as a transceiver 3413. The processor 3411 may perform the afore-described functions, procedures, and/or methods. The processor 3411 may implement one or more protocols. For example, the processor 3411 may implement one or more layers of radio interface protocols. The memory 3412 may be coupled to the processor 3411 and store various types of information and/or commands. The transceiver 3413 may be coupled to the processor 3411 and controlled to transmit and receive radio signals.

The second device 3420 may include at least one processor such as a processor 3421, at least one memory such as a memory 3422, and at least one transceiver such as a transceiver 3423. The processor 3421 may perform the afore-described functions, procedures, and/or methods. The processor 3421 may implement one or more protocols. For example, the processor 3421 may implement one or more layers of radio interface protocols. The memory 3422 may be coupled to the processor 3421 and store various types of information and/or commands. The transceiver 3423 may be coupled to the processor 3421 and controlled to transmit and receive radio signals.

The memory 3412 and/or the memory 3422 may be coupled to the processor 3411 and/or the processor 3421 inside or outside the processor 3411 and/or the processor 3421, and may be coupled to another processor by various technologies such as a wired or wireless connection.

The first device 3410 and/or the second device 3420 may include one or more antennas. For example, an antenna 3414 and/or an antenna 3424 may be configured to transmit and receive radio signals.

Figure 35:
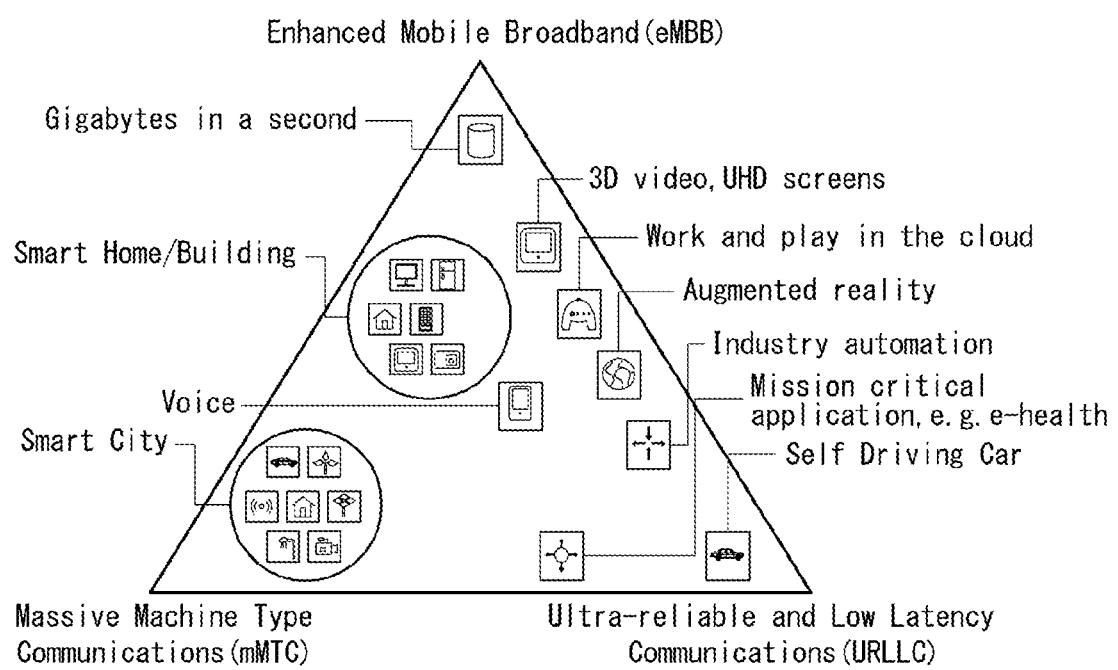
FIG. 35 illustrates exemplary 5G use scenarios.

FIG. 35 illustrates exemplary 5G use scenarios.

Referring to FIG. 35, three key requirement areas of 5G include (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or AR. Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential IoT devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases included in a triangle in FIG. 35 will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as VR and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost-efficient and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

The methods described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in the methods of the present disclosure may be rearranged. Some constructions of any one method may be included in another method and may be replaced with corresponding constructions of another method. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure may be implemented by various means, for example, hardware, firmware, software, or a combination thereof. In a hardware implementation, an embodiment of the present disclosure may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

For example, the present disclosure may be implemented a device or apparatus in the form of a system on chip (SOC). The device or apparatus may be equipped in the UE or the base station, and may comprise a memory and a processor. The memory stores instructions or executable codes and is operatively connected to the processor. The processor is coupled to the memory and may be configured to implement the operations including the methods in accordance to the present disclosure when executing the instructions or executable codes stored in the memory.

In a firmware or software implementation, methods according to the present disclosure may be implemented in the form of a module, a procedure, a function, etc which are configured to perform the functions or operations as described in the present specification. Software code may be stored in a computer-readable medium in the form of instructions and/or data and may be executed by a processor. The computer-readable medium is located at the interior or exterior of the processor and may transmit and receive data to and from the processor via various known means.

It will be apparent to those skilled in the art that various modifications and variations can be made in the present disclosure without departing from the scope of the invention. Thus, it is intended that the present disclosure cover the modifications and variations of this invention provided they come within the scope of the appended claims and their equivalents.

Although schemes of performing uplink transmissions in the wireless communication system of the present disclosure are described focusing on the examples applied to the 3GPP LTE/LTE-A system/5G system (New RAT system), the present disclosure can be applied to various wireless communication systems.

What is claimed is:

1. A method of receiving a downlink signal by a user equipment, the method comprising:
receiving first time offset information and second time offset information from a base station, each of the first time offset information and the second time offset information indicating a time offset between a receiving time of a specific signal and a receiving time of a specific channel related to the specific signal, the first time offset information being configured to have a shorter length than the second time offset information; and
monitoring the specific signal at a time position determined based on one offset information of the first time offset information and the second time offset information,
wherein the one offset information is determined based on a capability of the user equipment.

2. The method according to claim 1, wherein the first time offset information and the second time offset information are received through a system information block (SIB).

3. The method according to claim 2, wherein the first time offset information and the second time offset information are received through independent fields of the SIB.

4. The method according to claim 1, wherein the first time offset information and the second time offset information are received through a radio resource control (RRC) signal.

5. The method according to claim 4, wherein the first time offset information and the second time offset information are received through independent fields of the RRC signal.

6. The method according to claim 1, wherein each of the first time offset information and the second time offset information indicates a time offset between a reception ending time of the specific signal and a reception starting time of the specific channel.

7. The method according to claim 1, wherein each of the first time offset information and the second time offset information indicates a time offset between a reception starting time of the specific signal and a reception starting time of the specific channel.

8. The method according to claim 6, wherein the time position is determined based on a paging occasion (PO) configured for the user equipment and the one time offset information.

9. The method according to claim 7, wherein the time position is determined based on a paging occasion (PO) configured for the user equipment and the one time offset information.

10. The method according to claim 1, further comprising reporting the capability of the user equipment to the base station.

11. The method according to claim 1, further comprising monitoring the specific channel based on detection of the specific signal.

12. The method according to claim 1, wherein the specific signal is a physical signal, and the specific channel is a physical control channel.

13. The method according to claim 12, wherein the physical signal is a wake up signal (WUS), and the physical control channel is a narrowband physical downlink control channel (NPDCCH) for paging.

14. A user equipment for receiving a downlink signal in a wireless communication system, the user equipment comprising:
a transceiver; and
a processor operatively connected to the transceiver,
wherein the processor is configured to:
control the transceiver to receive first time offset information and second time offset information from a base station, and monitor the specific signal at a time position determined based on one offset information of the first time offset information and the second time offset information,
wherein each of the first time offset information and the second time offset information indicates a time offset between a receiving time of a specific signal and a receiving time of a specific channel related to the specific signal, and the first time offset information is configured to have a shorter length than the second time offset information, and
wherein the one offset information is determined based on a capability of the user equipment.

15. An apparatus for a user equipment for receiving a downlink signal in a wireless communication system, the apparatus comprising:
a memory including executable codes; and
a processor operatively connected to the memory,
wherein the processor is configured to execute the executable codes to implement operations comprising:
receiving first time offset information and second time offset information from a base station, and monitoring the specific signal at a time position determined based on one offset information of the first time offset information and the second time offset information,
wherein each of the first time offset information and the second time offset information indicates a time offset between a receiving time of a specific signal and a receiving time of a specific channel related to the specific signal, and the first time offset information is configured to have a shorter length than the second time offset information, and
wherein the one offset information is determined based on a capability of the user equipment.

* * * * *